(12) United States Patent
Rosenberg

(10) Patent No.: US 8,762,435 B1
(45) Date of Patent: *Jun. 24, 2014

(54) COLLABORATIVE REJECTION OF MEDIA FOR PHYSICAL ESTABLISHMENTS

(75) Inventor: Louis B. Rosenberg, Pismo Beach, CA (US)

(73) Assignee: Google Inc., Mountain View, CA (US)

( * ) Notice: Subject to any disclaimer, the term of this patent is extended or adjusted under 35 U.S.C. 154(b) by 214 days.

This patent is subject to a terminal disclaimer.

(21) Appl. No.: 13/370,503

(22) Filed: Feb. 10, 2012

Related U.S. Application Data

(60) Division of application No. 11/744,879, filed on May 6, 2007, now Pat. No. 8,176,101, and a continuation-in-part of application No. 11/533,037, filed on Sep. 19, 2006, now Pat. No. 7,562,117, and a continuation-in-part of application No. 11/383,197, filed on May 12, 2006, now abandoned, and a continuation-in-part of application No. 11/697,732, filed on Apr. 8, 2007, now abandoned, and a continuation-in-part of application No. 11/425,990, filed on Jun. 22, 2006, now abandoned, and a continuation-in-part of application No. 11/676,298, filed on Feb. 18, 2007, now abandoned.

(60) Provisional application No. 60/902,978, filed on Feb. 22, 2007, provisional application No. 60/897,555, filed on Jan. 26, 2007, provisional application No. 60/898,375, filed on Jan. 30, 2007, provisional application No. 60/843,444, filed on Sep. 8, 2006, provisional application No. 60/720,071, filed on Sep. 23, 2005, provisional application No. 60/723,021, filed on Oct. 1, 2005, provisional application No. 60/809,951, filed on May 31, 2006, provisional application No. 60/731,180, filed on Oct. 29, 2005.

(51) Int. Cl.
*G06F 12/00* (2006.01)
*G06F 17/30* (2006.01)

(52) U.S. Cl.
USPC .................................. 707/828; 455/446

(58) Field of Classification Search
USPC .................................. 707/828; 455/446
See application file for complete search history.

(56) References Cited

U.S. PATENT DOCUMENTS

| 4,018,121 A | 4/1977 | Chowning |
| 4,054,749 A | 10/1977 | Suzuki et al. |

(Continued)

FOREIGN PATENT DOCUMENTS

| DE | 19650900 | 6/1998 |
| WO | 20061086439 | 8/2006 |

OTHER PUBLICATIONS

"Beat rates per minute", downloaded from www.bpmlist.com on Jun. 27, 2006. Lulu Publishing. ISBN 1-4116-4211-2, (Jun. 27, 2006).

(Continued)

*Primary Examiner* — Hares Jami
(74) *Attorney, Agent, or Firm* — Morris & Kamlay LLP

(57) ABSTRACT

A system, computer implemented method, and computer readable storage medium is provided which enables customers of an establishment to collaboratively reject a media file that is currently playing and/or pending to be played within that establishment by entering data into a personal wireless portable computing device on their person, for example a cellular telephone. Upon entering a rejection request, and where necessary an establishment identifier, a message is sent over a wireless link to a media server which performs a series of logical tests to determine if the media file is actually terminated prior to full completion of play. In this way, a plurality of separate customers may use their portable computing devices to collaboratively reject specific musical media file selections that are currently playing or currently pending for play within a particular physical establishment.

16 Claims, 7 Drawing Sheets

(56) References Cited

U.S. PATENT DOCUMENTS

| | | |
|---|---|---|
| 4,091,302 A | 5/1978 | Yamashita |
| 4,360,345 A | 11/1982 | Hon |
| 4,430,595 A | 2/1984 | Nakasone et al. |
| 4,490,810 A | 12/1984 | Hon |
| 4,712,101 A | 12/1987 | Culver |
| 4,823,634 A | 4/1989 | Culver |
| 4,868,549 A | 9/1989 | Affinito et al. |
| 4,907,973 A | 3/1990 | Hon |
| 4,983,901 A | 1/1991 | Lehmer |
| 5,031,914 A | 7/1991 | Rosenthal |
| 5,047,918 A | 9/1991 | Schwartz et al. |
| 5,164,530 A | 11/1992 | Iwase |
| 5,185,561 A | 2/1993 | Good et al. |
| 5,186,629 A | 2/1993 | Rohen |
| 5,189,355 A | 2/1993 | Larkins et al. |
| 5,215,468 A | 6/1993 | Lauffer et al. |
| 5,220,260 A | 6/1993 | Schuler |
| 5,263,715 A | 11/1993 | Matsumoto et al. |
| 5,273,038 A | 12/1993 | Beavin |
| 5,296,846 A | 3/1994 | Ledley |
| 5,296,871 A | 3/1994 | Paley |
| 5,359,527 A | 10/1994 | Takanabe et al. |
| 5,442,557 A | 8/1995 | Kaneko |
| 5,499,360 A | 3/1996 | Barbara et al. |
| 5,534,917 A | 7/1996 | MacDougall |
| 5,559,412 A | 9/1996 | Schuler |
| 5,572,201 A | 11/1996 | Graham et al. |
| 5,614,687 A | 3/1997 | Yamada et al. |
| 5,629,594 A | 5/1997 | Jacobus et al. |
| 5,634,051 A | 5/1997 | Thomson |
| 5,643,087 A | 7/1997 | Marcus et al. |
| 5,666,138 A | 9/1997 | Culver |
| 5,701,140 A | 12/1997 | Rosenberg et al. |
| 5,704,791 A | 1/1998 | Gillio |
| 5,709,219 A | 1/1998 | Chen et al. |
| 5,721,566 A | 2/1998 | Rosenberg et al. |
| 5,724,264 A | 3/1998 | Rosenberg et al. |
| 5,728,960 A | 3/1998 | Sitrick |
| 5,731,804 A | 3/1998 | Rosenberg |
| 5,734,373 A | 3/1998 | Rosenberg et al. |
| 5,739,811 A | 4/1998 | Rosenberg et al. |
| 5,742,278 A | 4/1998 | Chen et al. |
| 5,747,714 A | 5/1998 | Kniest et al. |
| 5,754,023 A | 5/1998 | Roston et al. |
| 5,755,577 A | 5/1998 | Gillio |
| 5,767,839 A | 6/1998 | Rosenberg |
| 5,769,640 A | 6/1998 | Jacobus et al. |
| 5,791,908 A | 8/1998 | Gillio |
| 5,800,177 A | 9/1998 | Gillio |
| 5,800,178 A | 9/1998 | Gillio |
| 5,821,920 A | 10/1998 | Rosenberg et al. |
| 5,825,308 A | 10/1998 | Rosenberg |
| 5,828,197 A | 10/1998 | Martin et al. |
| 5,857,939 A | 1/1999 | Kaufman |
| 5,870,740 A | 2/1999 | Rose et al. |
| 5,882,206 A | 3/1999 | Gillio |
| 5,889,670 A | 3/1999 | Schuler et al. |
| 5,889,672 A | 3/1999 | Schuler et al. |
| 5,890,152 A | 3/1999 | Rapaport et al. |
| 5,897,437 A | 4/1999 | Nishiumi et al. |
| 5,916,063 A | 6/1999 | Alessandri |
| 5,928,248 A | 7/1999 | Acker |
| 5,952,596 A | 9/1999 | Kondo |
| 5,959,613 A | 9/1999 | Rosenberg et al. |
| 6,024,576 A | 2/2000 | Moore et al. |
| 6,088,017 A | 7/2000 | Tremblay et al. |
| 6,096,004 A | 8/2000 | Meglan et al. |
| 6,106,301 A | 8/2000 | Merril |
| 6,111,577 A | 8/2000 | Zilles et al. |
| 6,119,114 A | 9/2000 | Smadja |
| 6,122,520 A | 9/2000 | Want et al. |
| 6,154,201 A | 11/2000 | Levin et al. |
| 6,160,489 A | 12/2000 | Perry et al. |
| 6,192,340 B1 | 2/2001 | Abecassis |
| 6,199,067 B1 | 3/2001 | Geller |
| 6,211,861 B1 | 4/2001 | Rosenberg et al. |
| 6,230,047 B1 | 5/2001 | McHugh |
| 6,244,742 B1 | 6/2001 | Yamada et al. |
| 6,248,946 B1 | 6/2001 | Dwek |
| 6,256,011 B1 | 7/2001 | Culver |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,323,412 B1 | 11/2001 | Loo |
| 6,366,272 B1 | 4/2002 | Rosenberg et al. |
| 6,376,971 B1 | 4/2002 | Pelrine et al. |
| 6,401,027 B1 | 6/2002 | Xu et al. |
| 6,411,896 B1 | 6/2002 | Shuman et al. |
| 6,429,846 B2 | 8/2002 | Rosenberg et al. |
| 6,470,207 B1 | 10/2002 | Simon et al. |
| 6,470,302 B1 | 10/2002 | Cunningham et al. |
| 6,498,982 B2 | 12/2002 | Bellesfield et al. |
| 6,501,420 B2 | 12/2002 | Townsend et al. |
| 6,504,571 B1 | 1/2003 | Narayanaswami et al. |
| 6,526,411 B1 | 2/2003 | Ward |
| 6,563,487 B2 | 5/2003 | Martin et al. |
| 6,564,210 B1 | 5/2003 | Korda et al. |
| 6,572,511 B1 | 6/2003 | Volpe |
| 6,598,707 B2 | 7/2003 | Nakagaki et al. |
| 6,623,427 B2 | 9/2003 | Mandigo |
| 6,636,835 B2 | 10/2003 | Ragsdale-Elliott et al. |
| 6,640,187 B1 | 10/2003 | Chenault et al. |
| 6,655,817 B2 | 12/2003 | Devlin et al. |
| 6,657,116 B1 | 12/2003 | Gunnerson |
| 6,665,644 B1 | 12/2003 | Kanevsky et al. |
| 6,671,736 B2 | 12/2003 | Virine et al. |
| 6,683,538 B1 | 1/2004 | Wilkes, Jr. |
| 6,686,531 B1 | 2/2004 | Pennock et al. |
| 6,686,911 B1 | 2/2004 | Levin et al. |
| 6,697,044 B2 | 2/2004 | Shahoian et al. |
| 6,721,706 B1 | 4/2004 | Strubbe et al. |
| 6,732,090 B2 | 5/2004 | Shanahan et al. |
| 6,735,568 B1 | 5/2004 | Buckwalter et al. |
| 6,749,537 B1 | 6/2004 | Hickman |
| 6,760,721 B1 | 7/2004 | Chasen et al. |
| 6,765,495 B1 | 7/2004 | Dunning et al. |
| 6,768,066 B2 | 7/2004 | Wehrenberg |
| 6,768,246 B2 | 7/2004 | Pelrine et al. |
| 6,772,026 B2 | 8/2004 | Bradbury et al. |
| 6,778,226 B1 | 8/2004 | Eshelman et al. |
| 6,781,289 B2 | 8/2004 | Heinz et al. |
| 6,801,837 B2 | 10/2004 | Carlstedt et al. |
| 6,804,643 B1 | 10/2004 | Kiss |
| 6,808,472 B1 | 10/2004 | Hickman |
| 6,812,394 B2 | 11/2004 | Weissflog |
| 6,812,624 B1 | 11/2004 | Pei et al. |
| 6,816,711 B2 | 11/2004 | Standke et al. |
| 6,819,267 B1 | 11/2004 | Edmark et al. |
| 6,822,635 B2 | 11/2004 | Shahoian et al. |
| 6,829,599 B2 | 12/2004 | Chidlovskii |
| 6,858,970 B2 | 2/2005 | Malkin et al. |
| 6,863,220 B2 | 3/2005 | Selker |
| 6,867,733 B2 | 3/2005 | Sandhu et al. |
| 6,871,142 B2 | 3/2005 | Kumada et al. |
| 6,882,086 B2 | 4/2005 | Kornbluh et al. |
| 6,885,362 B2 | 4/2005 | Suomela |
| 6,888,457 B2 | 5/2005 | Wilkinson et al. |
| 6,906,643 B2 | 6/2005 | Samadani et al. |
| 6,915,295 B2 | 7/2005 | Okamoto et al. |
| 6,921,351 B1 | 7/2005 | Hickman et al. |
| 6,929,481 B1 | 8/2005 | Alexander et al. |
| 6,934,700 B1 | 8/2005 | Ijdens et al. |
| 6,941,324 B2 | 9/2005 | Plastina et al. |
| 6,956,538 B2 | 10/2005 | Moore |
| 6,968,179 B1 | 11/2005 | De Vries |
| 6,970,088 B2 | 11/2005 | Kovach |
| 6,982,697 B2 | 1/2006 | Wilson et al. |
| 6,983,139 B2 | 1/2006 | Dowling et al. |
| 6,985,143 B2 | 1/2006 | Pharr |
| 6,986,320 B2 | 1/2006 | Shelton et al. |
| 6,987,221 B2 | 1/2006 | Platt |
| 6,991,586 B2 | 1/2006 | Lapcevic |
| 6,993,532 B1 | 1/2006 | Platt et al. |

(56) References Cited

U.S. PATENT DOCUMENTS

| | | |
|---|---|---|
| 7,003,122 B2 | 2/2006 | Chen |
| 7,007,001 B2 | 2/2006 | Oliver et al. |
| 7,023,423 B2 | 4/2006 | Rosenberg |
| 7,046,588 B2 | 5/2006 | Heo |
| 7,100,835 B2 | 9/2006 | Selker |
| 7,181,438 B1 | 2/2007 | Szabo |
| 7,207,935 B1 | 4/2007 | Lipo |
| 7,227,071 B2 | 6/2007 | Tagawa et al. |
| 7,249,126 B1 | 7/2007 | Ginsburg et al. |
| 7,283,997 B1 | 10/2007 | Howard et al. |
| 7,293,060 B2 | 11/2007 | Komsi |
| 7,343,317 B2 | 3/2008 | Jokinen et al. |
| 7,354,380 B2 | 4/2008 | Volpe, Jr. |
| 7,406,612 B2 | 7/2008 | O'Connor et al. |
| 7,418,444 B2 | 8/2008 | Flank et al. |
| 7,489,979 B2 | 2/2009 | Rosenberg |
| 7,542,816 B2 | 6/2009 | Rosenberg |
| 7,562,117 B2 | 7/2009 | Rosenberg |
| 7,586,032 B2 | 9/2009 | Louis |
| 7,603,414 B2 | 10/2009 | Rosenberg |
| 7,613,531 B2 | 11/2009 | Korst et al. |
| 7,693,887 B2 | 4/2010 | McLaughlin |
| 7,720,686 B2 | 5/2010 | Volk et al. |
| 7,729,945 B1 | 6/2010 | Katz et al. |
| 7,765,326 B2 | 7/2010 | Robbin et al. |
| 7,882,140 B1 | 2/2011 | DiLorenzo |
| 7,939,422 B2 | 5/2011 | Ingle et al. |
| 8,219,224 B2 * | 7/2012 | Kalis .................. 700/94 |
| 2001/0003542 A1 | 6/2001 | Kita |
| 2001/0004622 A1 | 6/2001 | Alessandri |
| 2001/0047348 A1 | 11/2001 | Davis |
| 2001/0054032 A1 | 12/2001 | Goldman et al. |
| 2002/0016786 A1 | 2/2002 | Pitkow et al. |
| 2002/0054060 A1 | 5/2002 | Schena |
| 2002/0068583 A1 | 6/2002 | Murray |
| 2002/0078045 A1 | 6/2002 | Dutta |
| 2002/0091796 A1 | 7/2002 | Higginson et al. |
| 2002/0091848 A1 | 7/2002 | Agresta et al. |
| 2002/0116263 A1 | 8/2002 | Gouge |
| 2002/0116476 A1 | 8/2002 | Eyal et al. |
| 2002/0123988 A1 | 9/2002 | Dean et al. |
| 2002/0133418 A1 | 9/2002 | Hammond et al. |
| 2002/0142701 A1 | 10/2002 | Rosenberg |
| 2002/0183118 A1 | 12/2002 | Wolinsky |
| 2002/0186221 A1 | 12/2002 | Bell |
| 2002/0198660 A1 | 12/2002 | Lutter et al. |
| 2003/0011467 A1 | 1/2003 | Suomela |
| 2003/0033287 A1 | 2/2003 | Shanahan et al. |
| 2003/0033301 A1 | 2/2003 | Cheng et al. |
| 2003/0041105 A1 | 2/2003 | Patrick |
| 2003/0047683 A1 | 3/2003 | Kaushal |
| 2003/0069077 A1 | 4/2003 | Korienek |
| 2003/0074130 A1 | 4/2003 | Negishi et al. |
| 2003/0089218 A1 | 5/2003 | Gang et al. |
| 2003/0110038 A1 | 6/2003 | Sharma et al. |
| 2003/0115193 A1 | 6/2003 | Okamoto et al. |
| 2003/0135490 A1 | 7/2003 | Barrett et al. |
| 2003/0187837 A1 | 10/2003 | Culliss |
| 2003/0193572 A1 | 10/2003 | Wilson et al. |
| 2003/0195884 A1 | 10/2003 | Boyd et al. |
| 2003/0217007 A1 | 11/2003 | Fukushima et al. |
| 2003/0220917 A1 | 11/2003 | Copperman et al. |
| 2003/0236582 A1 | 12/2003 | Zamir et al. |
| 2004/0015714 A1 | 1/2004 | Abraham et al. |
| 2004/0017482 A1 | 1/2004 | Weitman |
| 2004/0019588 A1 | 1/2004 | Doganata et al. |
| 2004/0059708 A1 | 3/2004 | Dean et al. |
| 2004/0068486 A1 | 4/2004 | Chidlovskii |
| 2004/0097806 A1 | 5/2004 | Hunter et al. |
| 2004/0103087 A1 | 5/2004 | Mukherjee et al. |
| 2004/0117306 A1 | 6/2004 | Karaoguz et al. |
| 2004/0124248 A1 | 7/2004 | Selker |
| 2004/0131333 A1 * | 7/2004 | Fung et al. .................. 386/69 |
| 2004/0164971 A1 | 8/2004 | Hayward et al. |
| 2004/0166937 A1 | 8/2004 | Rothschild et al. |
| 2004/0176134 A1 | 9/2004 | Goldthwaite et al. |
| 2004/0186824 A1 | 9/2004 | Delic et al. |
| 2004/0203633 A1 | 10/2004 | Knauerhase et al. |
| 2004/0203901 A1 | 10/2004 | Wilson et al. |
| 2004/0215469 A1 | 10/2004 | Fukushima et al. |
| 2004/0224638 A1 | 11/2004 | Fadell et al. |
| 2004/0225519 A1 | 11/2004 | Martin |
| 2004/0225635 A1 | 11/2004 | Toyama et al. |
| 2004/0254717 A1 | 12/2004 | Sugahara et al. |
| 2005/0003831 A1 | 1/2005 | Anderson |
| 2005/0012723 A1 | 1/2005 | Pallakoff |
| 2005/0021418 A1 | 1/2005 | Marcus et al. |
| 2005/0021470 A1 | 1/2005 | Martin et al. |
| 2005/0032528 A1 | 2/2005 | Dowling et al. |
| 2005/0039206 A1 | 2/2005 | Opdycke |
| 2005/0060299 A1 | 3/2005 | Filley et al. |
| 2005/0071328 A1 | 3/2005 | Lawrence |
| 2005/0080786 A1 | 4/2005 | Fish et al. |
| 2005/0088318 A1 | 4/2005 | Liu et al. |
| 2005/0096047 A1 | 5/2005 | Haberman et al. |
| 2005/0107218 A1 | 5/2005 | Chuang et al. |
| 2005/0107688 A1 | 5/2005 | Strommer |
| 2005/0114149 A1 | 5/2005 | Rodriguez et al. |
| 2005/0126370 A1 | 6/2005 | Takai et al. |
| 2005/0129253 A1 | 6/2005 | Chen |
| 2005/0139660 A1 | 6/2005 | Maxymych et al. |
| 2005/0149213 A1 | 7/2005 | Guzak et al. |
| 2005/0149499 A1 | 7/2005 | Franz et al. |
| 2005/0154636 A1 | 7/2005 | Hildinger et al. |
| 2005/0154761 A1 | 7/2005 | Lee et al. |
| 2005/0174975 A1 | 8/2005 | Mgrdechian et al. |
| 2005/0177614 A1 | 8/2005 | Bourne |
| 2005/0212749 A1 | 9/2005 | Marvit et al. |
| 2005/0222981 A1 | 10/2005 | Lawrence et al. |
| 2005/0222989 A1 | 10/2005 | Haveliwala et al. |
| 2005/0223002 A1 | 10/2005 | Agarwal et al. |
| 2005/0227712 A1 | 10/2005 | Estevez et al. |
| 2005/0251576 A1 | 11/2005 | Weel |
| 2005/0278317 A1 | 12/2005 | Gross et al. |
| 2005/0286546 A1 | 12/2005 | Bassoli et al. |
| 2005/0288954 A1 | 12/2005 | McCarthy et al. |
| 2006/0017692 A1 | 1/2006 | Wehrenberg et al. |
| 2006/0022955 A1 | 2/2006 | Kennedy |
| 2006/0026521 A1 | 2/2006 | Hotelling et al. |
| 2006/0031551 A1 | 2/2006 | Agresta et al. |
| 2006/0060068 A1 | 3/2006 | Hwang et al. |
| 2006/0095331 A1 | 5/2006 | O'Malley et al. |
| 2006/0095412 A1 | 5/2006 | Zito et al. |
| 2006/0107822 A1 | 5/2006 | Bowen |
| 2006/0111621 A1 | 5/2006 | Coppi et al. |
| 2006/0121878 A1 | 6/2006 | Kelly et al. |
| 2006/0161621 A1 | 7/2006 | Rosenberg |
| 2006/0167576 A1 | 7/2006 | Rosenberg |
| 2006/0167943 A1 | 7/2006 | Rosenberg |
| 2006/0169125 A1 | 8/2006 | Ashkenazi et al. |
| 2006/0173828 A1 | 8/2006 | Rosenberg |
| 2006/0173837 A1 | 8/2006 | Berstis et al. |
| 2006/0188109 A1 | 8/2006 | Makino et al. |
| 2006/0189386 A1 | 8/2006 | Rosenberg |
| 2006/0195361 A1 | 8/2006 | Rosenberg |
| 2006/0212478 A1 | 9/2006 | Plastina et al. |
| 2006/0229058 A1 | 10/2006 | Rosenberg |
| 2006/0243120 A1 | 11/2006 | Takai et al. |
| 2006/0253210 A1 | 11/2006 | Rosenberg |
| 2006/0276919 A1 | 12/2006 | Shirai et al. |
| 2006/0288074 A1 | 12/2006 | Rosenberg |
| 2006/0292537 A1 * | 12/2006 | Nute et al. .................. 434/307 A |
| 2007/0044641 A1 | 3/2007 | McKinney et al. |
| 2007/0060446 A1 | 3/2007 | Asukai et al. |
| 2007/0067294 A1 | 3/2007 | Ward et al. |
| 2007/0074618 A1 | 4/2007 | Vergo |
| 2007/0074619 A1 | 4/2007 | Vergo |
| 2007/0113725 A1 | 5/2007 | Oliver et al. |
| 2007/0125852 A1 | 6/2007 | Rosenberg |
| 2007/0135264 A1 | 6/2007 | Rosenberg |
| 2007/0156676 A1 | 7/2007 | Rosenberg |
| 2007/0156677 A1 | 7/2007 | Szabo |
| 2007/0161382 A1 | 7/2007 | Melinger et al. |
| 2007/0162341 A1 | 7/2007 | McConnell et al. |

(56) References Cited

U.S. PATENT DOCUMENTS

| | | |
|---|---|---|
| 2007/0271228 A1 | 11/2007 | Querel |
| 2008/0005075 A1 | 1/2008 | Horvitz et al. |
| 2008/0016040 A1 | 1/2008 | Jones et al. |
| 2008/0016218 A1 | 1/2008 | Jones et al. |
| 2011/0009051 A1 | 1/2011 | Khedouri et al. |

OTHER PUBLICATIONS

"Boddybug Calorie Management System", downloaded from www.ubergizmo.com/15/archives/2005/03/boddybug_calorie.html on Jul. 9, 2007, (Mar. 18, 2005).
"Dialogr", http://www.dialogr.com/PostThought.cfm?/TopicId=684, first printed May 22, 2007.
"Human Metrics: Jung Typology test", available at http://www.humanmetrics.com/cgi-win/JTypes2.asp last visited Jun. 15, 2007.
"Jukebox Without Quarters", Business Opportunities Weblog, http://www.business-opportunities.bix/2007/03/30/jukebox-without-quarters/, cited Mar. 30, 2007, printed May 22, 2007,2 pages.
"PCDJ Red Virtual Rack Module", by Visiosonic of Clearwater, FL. Downloaded from www.visiosonic.com on Jun. 27, 2006.
"Remotely Operated Vehicle", www.seabotix.com/products/lbv150.htm, (Dec. 2001).
"Remotely Operated Vehicles Seaeye Falcon", www.roperresources.com, (May 2002).
"Total Immersion", D'FUSION Software, 2004.
"Tune Your Run", Apple Computer/Nike, downloaded from www.apple.com on Jun. 28, 2006.
"'Unmanned Aircraft Systems", www.baiaerosystems.com, (1985).
"www.confluence.org", first visited May 2005.
"www.fitlinxx.com", downloaded from www.fitlinxx.com/brand/about_tour3.htm on Jul. 9, 2007, (2003).
"www.gesturetek.com", (Jul. 1996).
"www.reactrix.com", (2002).
"www.wwmx.org", First visited in May 2005.
"YMCA", downloaded from www.ymcamidpen.org/textpage.php?b=2&p=fitlinxx on Jul. 10, 2007, (2003).
Abrial, et al., "A New Contactless Smartcard IC Using an On-Chip Antenna and an Asynchronous Micro-controller", (2001).
Betlyon, Jim, "Omni Fitness Equipment Stores Integrate Physical Genius Online Fitness Tools", downloaded from www.physicalgenius.com on Aug. 5, 2007, (Apr. 19, 2000).
Brin and Page, "The Anatomy of a Large-Scale Hypertextual Search Engine", Standford University, 1998.
Casey, Michael, MPEG-7 Sound Recognition Tools, IEEE Transactions on Circuits and Systems for Video Technology vol. 11 No. 6, 2001.
Castelli, et al., "Habitat Telemonitoring System Based on the Sound Surveillance," 2003.
Castrillon, et al., "Identity and Gender Recognition Using the ENCARA Real-Time Face Detector", CAEPIA, (Nov. 2003).
Cook, Perry et al., "Using DSP-Based Parametric Physical Syntheses Models to Study Human Sound Perception", 2003 IEEE Workshop on Applications of Signal Processing to Audio and Acoustics, (2003).
Demartini, Marilyn "Cyber Fitness", downloaded from www.physicalmag.com/articlesTemp.as?dept=14&articleID=1812 on Jul. 10, 2007, (Feb. 18, 2001).
Finkelstein, Lev , "Placing Search in Context: The Concept Revisted", Zapper Technologies May 5, 2001.
Gordon, et al., "Silicon Optical Navigation", (2003).

Hayashi, J et al., "A Method for Estimating and Modeling Age and Gender Using Facial Image Processing", (2001).
Kawahara, et al., "Designing a Universal Remote Control for the Ubiquitous Computing Environment", EE Times, 2003.
Kornbluh, et al., "High-field Electrostriction of Elastomeric Polymer Dielectrics for Actuation", SPIE Conference on Electroactive Polymer Actuators and Devices, (Mar. 1999).
Lumia, R et al., "Microgripper design using electro-active polymers", SPIE Conference on Electroactive Polymer Actuators and Devices, SPEE vol. 3669, 1999, (Mar. 1999).
Martin, Keith D., "Sound-Source Recognition: A Theory and Computational Model", 1999 doctoral dissertation from MIT.
McKinney and Moelants, "Extracting the Perceptual Tempo from Music", published at the ISMIR 2004 5th International Conference on Music Information Retrieval, (2004).
McKinney, et al., "Deviations from the Resonance Theory of Temp Induction", published at the Conference on Interdisciplinary Musicology, (2004).
Metzger, Christian et al., "FreeDigiter: A Contact-free Device for Gesture Control", IEEE 8th International Symposium on Wearable Computers, (Nov. 4, 2004).
Morhring, et al., "Video See-Through AR on Consumer Cell-Phones", (Mar. 2004).
Munro, Aria "eNewsChannels", downloaded from enewschannels.com/20070106enc582-025321.php on Aug. 5, 2007, (Jul. 1, 2007).
Murray, et al., "Underwater Teleroboticsa and Virtual Reality: A New Partnership", NCCOSC RDT&E Division; Jun. 20, 1996; pp. 1-10; San Diego, CA, 1-10.
Nintendo, "Kirby's Tilt N' Tumble", downloaded from www.nintendo.com; Nov. 14, 2006; 2 pages.
Oguro, K et al., "Polymer Electrolyte Actuator with Gold Electrodes", SPIE Conference on Electroactive Polymer Actuators and Devices, SPEE vol. 3669, 1999.
Oliver, Nuria et al., "Enhancing Exercise Performance through Real-time Phsiological Monitoring and Music: A User Study", Proceedings of Pervasive Health 2006. Innsbruck, Austria. Nov. 2006.
Reinhold, Ross "Applications of Myers-Briggs Type Indicator, Personality Type", available at http://www.personalitypathways.com/ last visited Jun. 15, 2007.
Rosenberg, Louis "A force Feedback Programming Primer", Immersion Corporation, (1997).
Rosenberg, Louis "Virtual Fixtures: perceptual Overlays Enhance Operator Performance in Telepresence Tasks", Ph. D. Dissertation, Stanford University, (Jun. 1994).
Schotz, "Automatic prediction of speaker age using CART", (2003).
Shahinpoor, Mohsen "Electro-mechanics of ionoelastic beams as electrically-controllable artificial muscles", SPIE Conference on Electroactive Polymer Actuators and Devices, SPEE vol. 3669, 1999.
Sharper Image, "Laser Baseball", Item # PS115; downloaded from www.sharperimage.com on Dec. 9, 2005, 18 pages.
Spohrer, "Information in Places", IBM Systems Journal; 1999; pp. 602-628; vol. 38, No. 4, 602-628.
Sullivan, Danny, "Eurekster Launches Personalized Social Search", SearchEngineWatch.com Online Newsletter Jan. 24, 2004.
Wu and Childers, "Gender Recognition from Speech Part I: Coarse Analysis", (1991).
Wu and Childers, "Gender Recognition from Speech Part II: Fine Analysis", (1991).
"Yahoo media player", downloaded from www.yahoo.com on Sep. 19, 2006.

* cited by examiner

206

\>Now playing "Can't Touch This"
by MC Hammer
\>F6612#

207

\>Now playing "Can't Touch This"
by MC Hammer
\>F6612#105C##

208

\>F6612#105C#A##

212  Select Media Item

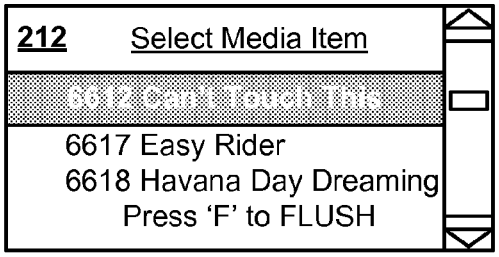

6617 Easy Rider
6618 Havana Day Dreaming
Press 'F' to FLUSH

214

\>RR#105C#A##

209
\> Media File 6612, "Can't Touch This," by MC Hammer has been FLUSHED by user 205 (6 customers have rejected this media file.)

211
\> Media File 6612, "Can't Touch This," cannot be cancelled. This selection was made by a premium member.

213
\> Your request to FLUSH Media File 6612, "Can't Touch This," was DENIED. You lack sufficient privileges to cancel a media file.

217
\> Your request to FLUSH Media File 6612, "Can't Touch This," was received too late. Please send requests within 30 seconds from the start of media file.

219
\> Your request to FLUSH Media File 6612, "Can't Touch This," has been received. Your request is 1 of 3 required to cancel this selection.

221

\> Your rejection rate is 1%

FIG. 2C

COLLABORATIVE REJECTION OF MEDIA FOR PHYSICAL ESTABLISHMENTS

CROSS-REFERENCE TO RELATED APPLICATIONS

This application is a divisional application of non-provisional U.S. patent application Ser. No. 11/744,879 filed May 6, 2007 now U.S. Pat. No. 8,176,101.

This application claims benefit and priority; under 35 U.S.C. §119(e) U.S. from provisional patent application Ser. Nos. 60/902,978 filed Feb. 22, 2007; 60/897,555 filed Jan. 26, 2007; 60/898,375 filed Jan. 30, 2007 and 60/843,444 filed Sep. 8, 2006.

This application is also a continuation in part of non-provisional U.S. patent application Ser. No. 11/533,037 filed Sep. 19, 2006 now U.S. Pat. No. 7,562,117. The aforementioned patent application claimed benefit and priority from provisional application 60/720,071 filed Sep. 23, 2005.

This application is also a continuation in part of non-provisional patent application Ser. No. 11/383,197 filed on May 12, 2006 now abandoned. The aforementioned application claimed benefit and priority from provisional application Ser. No. 60/723,021 filed Oct. 1, 2005.

This application is also a continuation in part of non-provisional U.S. patent application Ser. No. 11/697,732 filed Apr. 8, 2007 now abandoned. The aforementioned patent application claimed benefit and priority from provisional applications Ser. No. 60/897,555 filed Jan. 26, 2007 and 60/809,951 filed May 31, 2006.

This application is also a continuation in part of non-provisional U.S. patent application Ser. No. 11/425,990 filed on Jun. 22, 2006 now abandoned. The aforementioned application claimed benefit and priority from provisional application Ser. No. 60/731,180 filed Oct. 29, 2005.

This application is also a continuation-in-part of non-provisional U.S. patent application Ser. No. 11/676,298 filed Feb. 18, 2007 now abandoned. The aforementioned application claimed benefit and priority from provisional application Ser. No. 60/809,951 filed May 31, 2006.

This application is also a related application to co-pending U.S. non-provisional patent application Ser. No. 11/223,386 filed on Sep. 9, 2005; Ser. No. 11/267,079 filed on Nov. 3, 2005; Ser. No. 11/285,534 filed on Nov. 22, 2005; and Ser. No. 13/370,501 filed on Feb. 10, 2012.

All of the patent applications identified above are to the instant inventor and a common assignee and are hereby incorporated by reference in their entirety as if fully set forth herein.

RELEVANT INVENTIVE FIELD

The various exemplary embodiments relate generally to media file selection systems that enable a plurality of customers to reject one or more media files from current or impending play and more specifically to a collaborative mechanisms by which a plurality of customers in possession of portable computing devices may wirelessly add or reject media files to a playlist queue of media files to be played within traditional establishments such as a restaurants, bars, clubs, gyms, or retail stores.

BACKGROUND

In recent years, wireless phones and other similar portable wireless computing devices have become nearly universally carried by people around much of the world. Presently, wireless portable communication devices enable more than just person to person voice communication, enabling wireless data transmission as well. Wireless data transmission is enabled in a variety of ways including text messaging over phone networks, Bluetooth communications connections over ad hock networks, Wi-Fi communication, and other wireless communication connections. Using such available technologies, customers may selectively interact with remote servers over wireless communication links by entering data into a portable wireless computing device on their person. Even though many people in the industrialized world today, who visit physical establishments such as restaurants, bars, gyms, and clubs, enter those establishments equipped with at least one wireless portable computing device upon their person, there currently is no mechanism by which customers of a localized physical establishment may easily influence their environment using their wireless portable computing devices. The approaches described in this section are not necessarily approaches that have been previously conceived or pursued. Therefore, unless otherwise indicated herein, the approaches described in this section are not prior art to the claims in this application and are not admitted to be prior art by inclusion in this section.

SUMMARY

The above described needs in the relevant art are addressed by the various exemplary embodiments disclosed herein. Exemplary systematic, methodic, and computer readable storage media descriptions are provided which enables customers present in an establishment to reject media files to be played within that establishment by entering data into a wireless portable computing device on their person, for example a cellular telephone. Upon entering a media file rejection into the portable computing device and where necessary an establishment identifier, a message is sent over a wireless link to a media server which maintains a media menu for the establishment. The rejection is then processed by the media server and any rejections made in accordance with programmatic instructions provided therefore.

In an exemplary systematic embodiment, a collaborative media selection system for physical establishments is provided. The media selection system includes a networked media server having a processor, a computer readable storage medium operatively coupled to the processor. The computer readable storage medium comprises;

a playlist queue comprising an index of retrievable media files pending for play within an establishment, the index including a unique media identifier for each media file pending for play within the establishment; a plurality of the unique media identifiers each having at least one unique customer identifier of a selecting customer associated therewith and a set of logical instructions executable by the processor.

The logical instructions which when executed by the processor cause the processor to receive a plurality of customer generated rejection messages over the network, each of the rejection messages including a unique media identifier of a media file pending for play within the establishment and a unique customer identifier of a rejecting customer;

determine if a threshold number of rejections have been received for each unique media identifier to reject the media file associated with the media file identifier from the playlist queue;

remove each unique media file identifier from the playlist queue for which at least the threshold number of rejections has been received; and, defer removal of each unique media file identifier from the playlist queue for which the threshold number of rejections has not been received.

In an exemplary systematic embodiment, one or more sets of logical instructions are provided to cause the processor when executed to maintain rejection history statistics for each of a plurality of unique media file identifiers and/or a plurality of customers; the rejection history statistics including a number, a rate, a frequency, or a percentage of times that the media file associated with the unique media identifier has been removed from a playlist queue prior to its full play within an establishment as a result of received customer generated rejection messages.

In another exemplary systematic embodiment, one or more sets of logical instructions are provided to cause the processor when executed to charge a rejection fee to each customer account record associated with a removed media file identifier and/or crediting a fee to each selection customer account record associated with a removed media file identifier.

In another exemplary systematic embodiment, one or more sets of logical instructions are provided to cause the processor when executed to send a termination message to the portable computing device of each selecting customer whose media file selection was removed from the playlist queue;

In another exemplary systematic embodiment, one or more sets of logical instructions are provided to send the termination message including indicia that the customer's selection was rejected for play.

In another exemplary systematic embodiment, one or more sets of logical instructions are provided to ignore a received rejection message if the media file identifier specified by the rejection message was selected by a customer having the premium status; cause the processor to ignore a received media file rejection message if the rejection message was sent by a customer having a status level less than a selecting customer; cause the processor to charge a selection fee to the customer account record of each selecting customer of a media file which has completed play within the establishment.

In an exemplary systematic embodiment, the received customer generated rejection messages are sent from a portable computing device over the wireless network to the media server;

In an exemplary systematic embodiment, a database is provided and retrievably stored in the computer readable storage medium, the database comprising a plurality of customer account records, each of the customer account records having a unique customer identifier indexed thereto.

In an exemplary systematic embodiment, the computer readable storage medium has retrievably stored therein, a unique media playlist queue for each of a plurality of separate physical establishments, each of said media playlist queues being associated with a unique establishment identifier for a physical establishment to which it relates.

In an exemplary systematic embodiment, each of the customer account records further comprise a plurality of customer status levels, the customer status levels including a premium status and a standard status.

In an exemplary systematic embodiment, a customer having the premium status is afforded superior media file rejection privileges to those of a customer having the standard status; a customer having premium status may reject a media file requested by a customer having standard status but not visa versa.

In an exemplary systematic embodiment, each of the rejection messages includes an SMS formatted text message; a financial charge may be levied against a customer's telecommunication bill using a reverse billing process that adds a fee thereto; a termination message may be sent to the portable computing device further includes indicia of the number of rejections received for the customer's selection.

In an exemplary systematic embodiment, each customer generated rejection message includes a unique establishment identifier of a particular physical establishment to which the rejection message relates.

In various exemplary embodiments, the media file rejection comprises an SMS formatted text message; the charge or credit may be performed using a reverse SMS process; the acknowledgement may be accompanied by a whimsical or iconic effect. For example, a gong sound or a toilet flush sound audibly output from a portable computing device associated with a customer.

In other exemplary embodiments, a computer implemented method and a computer-readable medium is configured to carry out the foregoing processor instructions.

BRIEF DESCRIPTION OF DRAWINGS

The features and advantages of the various exemplary embodiments will become apparent from the following detailed description when considered in conjunction with the accompanying drawings. Where possible, the same reference numerals and characters are used to denote like features, elements, components or portions of the various inventive embodiments. It is intended that changes and modifications can be made to the described exemplary embodiments without departing from the true scope and spirit of the inventive embodiments as is defined by the claims.

FIG. 2C—depicts various exemplary interactions displayed on a portable computing device.

DETAILED DESCRIPTION

Figure 1:
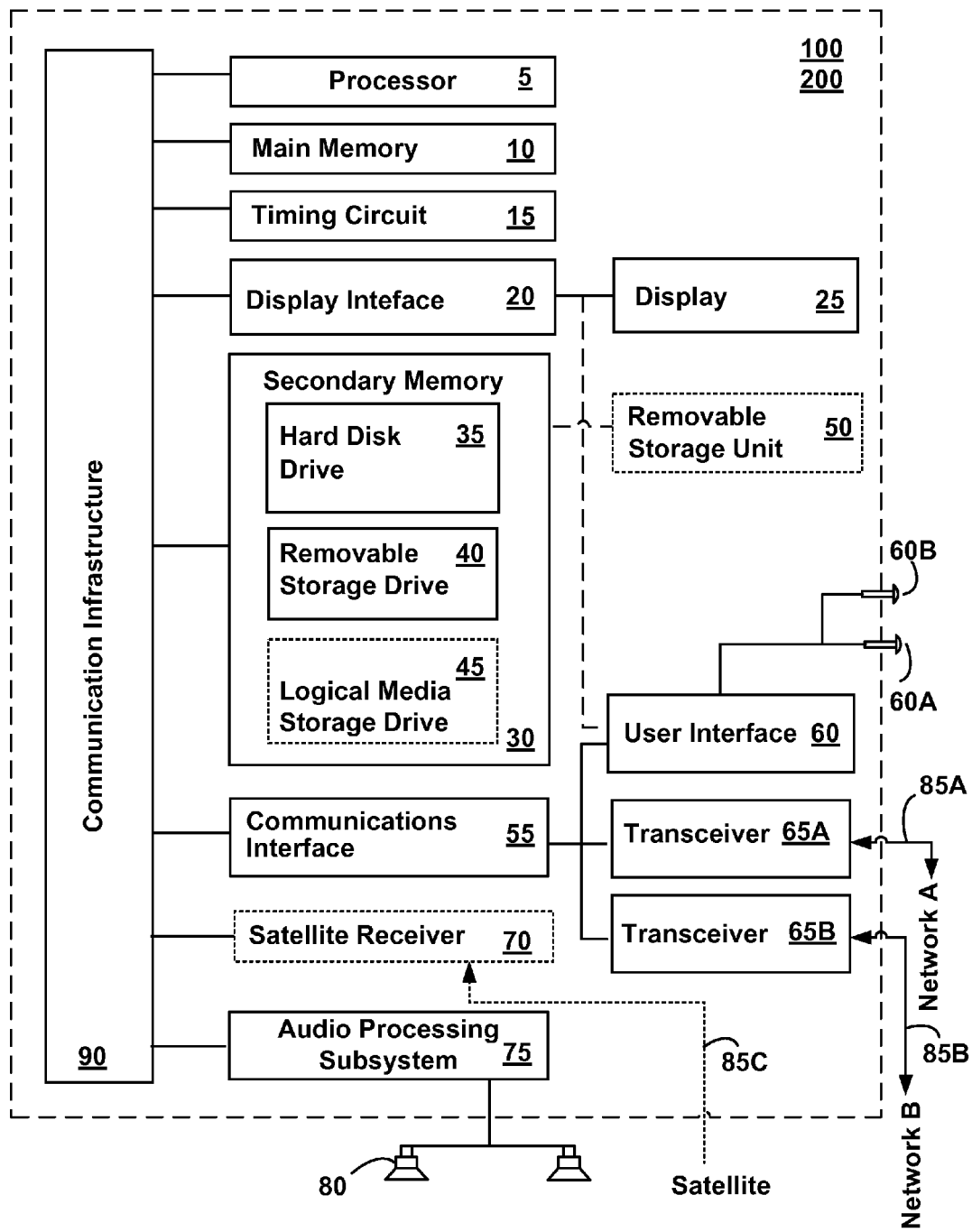
FIG. 1—depicts a generalized block diagram of a general purpose computer system suitable for use in the various described exemplary embodiments.

An increasing number of consumer products incorporate circuitry to play musical media files and other electronic media. An example of which is discussed in Apple Computer, Inc., patent application, US 2004/0224638 A1, Ser. No. 10/423,490 to Fadell, et al., which is herein incorporated by reference in its entirety. Such technologies are generally referred to as portable media players and enable large numbers of musical media files to be stored in an electronic memory and be selectively accessed for play through an audio output. Often physical establishments employ media playing devices to play musical media to the customers of those establishments through speakers and/or visual displays mounted in the walls and/or ceiling of the establishment.

In common exemplary embodiments, a digital playlist or other digital sequencing of musical media files may define the musical media to be played to the customers of a physical establishment through audio speakers. In some exemplary embodiments, the musical media is stored locally within a computer readable storage medium on the premises of the establishment and are selectively accessed for play to the customers using a preplanned playlist, an automated selection process, and/or a combination of thereof.

In other exemplary embodiments, the musical media files are remotely stored on an off premises server and are received or streamed over a communication link for local play to the customers of that establishment. Whichever architecture is employed, hardware and software infrastructures may be configured to enable musical media to be played to customers of an establishment based upon preplanned sequencing of musical media files and/or based upon an automated selection, for example randomized selection, of musical media files.

In an exemplary embodiment, a plurality of customers are in proximity to a localized physical establishment, such as a restaurant, bar, coffeehouse, retail store, section of a mall, or airport terminal, each customer having a wireless portable computing device on their person. The systems, computer implemented methods, and computer readable storage mediums enable the plurality of customers to select the sequence of musical media files that are played within the establishment by entering selection data into their personal wireless computing device and sending the selection data to a media server. The media server may be a local computer and/or media player, or a remote server. In many exemplary embodiments, the media server is a remote server that services a plurality of localized physical establishments, each physical establishment being identified by a unique establishment identifier or other unique identifier. The media server is configured to independently coordinate the play of media files within each of the physical establishments.

In an exemplary embodiment, the wireless portable computing device is a wireless phone, for example, a cellular telephone that is configured to send and receive data to the media server over a communication network. In this way, a customer of a physical establishment such as a restaurant, bar, gym, or club, may use their own personal wireless portable computing device (i.e. their phone) to select or reject media files that are added/deleted from a pending playlist queue of media files to be played within an identified physical establishment. In various exemplary embodiments, customers are charged a per-transaction fee for selecting or rejecting media files for public play within a physical establishment using their personal wireless portable computing device, and/or are charged a subscription fee for being enabled to select/reject media files for public play within a physical establishment using their personal wireless portable computing device.

In an exemplary embodiment, the customers send a text message, for example, a short messaging service (SMS) text message to the media server; the text message indicating the particular establishment for which the customer desires to add or reject a media file to a pending establishment playlist queue and indicating the particular media file(s) requested to be added or rejected to the establishment's playlist queue. In some exemplary embodiments, the particular establishment and the particular media files(s) are encoded within a single electronic message. In other exemplary embodiments, the establishment and the particular media files(s) are encoded within separate electronic messages.

In many exemplary embodiments the particular establishment is identified using a unique establishment identifier or other unique identifier that is specific the particular establishment, thereby enabling the identification of a particular establishment from among a plurality of possible establishments serviced by the media server. Similarly, in many exemplary embodiments, each particular media file is identified using a unique media identifier or other unique identifier that is specific the particular media file, thereby enabling the identification of a particular media file from among a plurality of possible media files supported by the media server. In some such exemplary embodiments, each unique establishment uses a different coding scheme for the media files available for play within that establishment. In other exemplary embodiments, a common coding scheme is used for media files across a plurality of separate localized physical establishments.

In some exemplary embodiments, the customer may also download an establishment specific media menu to his or her portable computing device, the media menu indicating a set of media files from which a selection may be made for play within the particular establishment. For example, a media menu for a particular establishment may comprise a listing of hundreds or thousands of songs that are available for play within a particular establishment, each encoded with a unique identifier. Once selected for play within a particular establishment, an indication of the selected media file may be added to an establishment-specific playlist queue for that establishment, as is generally stored upon or otherwise accessible to the media server. Analogously, a rejected media file may be removed from the establishment-specific playlist queue.

In some exemplary embodiments, the customer may download the current pending playlist queue from the media server for a particular establishment, for viewing on his or her portable computing device as it is currently pending for play within the particular establishment. In an exemplary embodiment, a local media player is configured to output songs to customers of a physical establishment through speakers of the establishment, the playing media being organized by a playlist queue (or other queuing means) maintained by the media server. The media player may be incorporated into a computer local to the establishment as is commonly performed using personal computer sound cards.

In various exemplary embodiments, a system, computer implemented method and computer readable storage medium are provided by which allows the customers to be easily billed for adding or rejecting musical media selections to the sequence of musical media selections being played to the customers of a particular physical establishment. In some such exemplary embodiments, the billing is provided through a reverse SMS billing process in which customers are billed for media selections or rejections for public play through a text messaging fee that is added to their standard cellular phone bill. In this way, customers may be billed without requiring a separate billing transaction apart from their standard phone bill. In some exemplary embodiments, customers may purchase a plurality of credits with a single billing transaction, each of the plurality of credits being redeemable for a media selections or rejections within a physical establishment. In some such exemplary embodiments, a plurality of customer accounts, each indicating the number of available credits for an associated customer may be stored upon or otherwise be accessible to the media server.

In this way, the customers of an establishment may select or reject for a fee, the music that is to be publicly played to other customers within the establishment by using his or her portable computing device; and, because the establishment may define the media menu from which customers may select or reject, the establishment maintains control over the set of media that may be played, under customer control within the establishment.

In an exemplary embodiment, password protection may be provided to ensure that only authorized customers of a physical establishment may make musical media selections or rejections for that establishment. In some such exemplary embodiments, the passwords are updated hourly, daily, or weekly, within an establishment to ensure that customers making selections or rejections for that establishment have been present within the physical bounds of that establishment within the password update interval. In an exemplary embodiment, the password may be updated visually, for example on a printed menu, printed board or visual display, for viewing by customers within the establishment. In a more advanced embodiment the password may be conveyed electronically to the portable wireless portable computing devices of current customers of an establishment through a local wireless communication link.

Where necessary, computer programs, algorithms and routines are envisioned to be programmed in a high level language object oriented language, for example Java™, C, C++, C#, CORBA, Visual Basic™. Database components may utilize any common database program, by way of example and not limitation, ORACLE™, Sequel Server™, MySQL™, SQL™, MS ACCESS™, DB2™, MS FOXBASE™, DBASE™, PostgreSQL™ and RBASE™.

For purposes of this specification, the term "program" is intended to be interpreted in its broadest sense to include all instructions executable by a processor whether embodied in hardware or software. Where applicable, references to various programs may be made in both singular and plural form. No limitation is intended by such grammatical usage as one skilled in the art will appreciate that multiple programs, objects, subprograms, subroutines, algorithms, applets, contexts, etc. may be implemented programmatically to implement the various inventive embodiments.

In various exemplary embodiments, unique media identifiers are assigned to each media file that may be added to a playlist queue, the unique media identifiers identifying the particular media file which is generally a particular song by a particular artist. In addition, unique establishment identifiers for each enabled physical establishment are assigned to each individual restaurant, bar, coffeehouse, retail store, gym, lobby, or other commercial establishment. In some exemplary embodiments, a unique identifier may be assigned to each separable venue within a single establishment that has separately playing public media, for example each separate dining room within a single restaurant that has separately playing music. In such exemplary embodiments, each dining room within the restaurant, each serviced by its own separate media player for public media play, is treated as a separate establishment for the purposes of this disclosure and assigned a separate unique establishment identifier.

Lastly, unique customer identifiers are assigned to each customer authorized to use the collaborative media file selection or rejection arrangements described herein. In some exemplary embodiments, the unique customer identifier may be uniquely defined for use by the media server. In other exemplary embodiments, the unique customer identifier may be an existing identifier such as a unique phone number, text messaging address, or other electronic address that is unique to each customer and/or is unique to the personal wireless computing device of each customer.

In an exemplary embodiment, an establishment may provide a printed menu of at least a portion of the pool of media files available for selection or rejection by customers within the establishment. The media menu generally includes a listing of available media selections (i.e. songs) for that establishment, each identified by the title of the song, the artist of the song, and a unique coded identifier for the song. The media menu may be printed as a sheet, flip book, menu, placemat, poster, or other convenient printed form that can be placed on tables or posted on walls of the establishment. In addition, other information may be provided on the printed media menu, for example, the album of that media file, and a date for that media file. In this way, each table within the establishment may be provided with a visual menu of a plurality of available media files from which the customer may select or reject along with the unique media identifier that the customer may use to select or reject that particular media file.

A customer may then view the unique identifier value associated with a media file that he or she desires to select or reject for public play within a particular establishment, enter it into his or her portable computing device as a means of selecting or rejecting it, and then send a wireless communication message to the media server indicating a desire to play that particular media file within the particular establishment. In this way, the media server may add that particular media file to the pending playlist queue for that particular physical establishment. It should be noted that while the printed menu of media files is described above as being located upon each table, it may also be printed or otherwise visually displayed upon walls, floors, or other surfaces of the establishment. It may be displayed as printed media or as an electronically projected media.

In some exemplary embodiments, the menu of available media files is sent electronically to the portable computing device of customers over a wireless communication link. In some such exemplary embodiments, a customer may enter a unique establishment identifier into his or her portable computing device, the code identifying the unique establishment that he or she has just entered. In some such exemplary embodiments, the customer may be required to enter a unique password for that establishment as well.

In response to entering the unique establishment identifier, the portable computing device may then download all or part of the menu of media files that are available for selection within the particular establishment and view them upon a display associated with the portable computing device. In some exemplary embodiments, the unique establishment identifier is automatically received by the portable computing device over a wireless link, via an RFID tag, or by scanning a barcode within the establishment.

For exemplary embodiments in which part or all of a media menu for a particular establishment is downloaded to the portable computing device of a customer, the customer may view the menu in an electronically displayed form upon a screen of the portable computing device or visual display. The customer may then select or reject one or more media file from the electronic media menu using traditional graphical user interface (GUI) interactions. In this way, a customer may enter an establishment, receive a unique identifier and/or password for that establishment (either visually or electronically), and using that unique identifier and/or password may download a menu of acceptable media files for that physical establishment.

The customer may then select or reject one or more media files from that menu of media files. An indication of the selection or rejection is sent to the media server, generally along with the unique identifier and/or password for that particular establishment. The media server may then add or remove that media selection to the playlist queue for that particular localized physical establishment. The media server may also charge the requesting customer for the selection or rejection, for example charging the customer twenty five cents or debiting the customer one or more pre-paid credits from a customer account.

A return message may then be sent by the media server back to the portable computing device of the requesting customer, for example as a text message, comprising a receipt and/or other confirmation of the selection and/or billing transaction. The return message may include, for example, a textual indication of the song that was selected or rejected, and the establishment that it was selected or rejected for. The return message also include an numeric indication of how many pending songs are ahead of that customer's selected song as currently stored in the pending playlist queue for the particular establishment. In some exemplary embodiments, the billing may be accomplished through the return message using a reverse SMS messaging billing process that is implemented through the sending of the return message. In some exemplary embodiments, the physical establishment receives an apportioned amount of the billed price. In this way, a physical establishment may have a monetary incentive to enable such a service within their establishment (i.e. their restaurant, bar, gym, retail store, or coffeehouse).

In some exemplary embodiments, the media server streams music to a media player of the establishment for play through the speakers of the establishment based upon customer music selections conveyed over a wireless communications link from portable computing devices on the person of the customers. In other exemplary embodiments, the media server sends unique media identifiers to a media player of the establishment, the media player then locally accesses the appropriate media file associated with the unique media identifiers and then plays the selections through the speakers of the establishment. Such a configuration may provide greater flexibility because it enables a single media server to coordinate separate media play for each of a plurality of separate establishments without the burden of streaming separate media files to each of the separate establishments. In either exemplary embodiment, a media player of an establishment is operative to publicly play a sequence of media files to the customers of the establishment based upon a playlist queue generated in response to customer media suggestions and/or rejections conveyed over a wireless communications link from portable computing devices on the person of the customers.

In this way, a plurality of current customers of a physical establishment may collaboratively compose a playlist queue of media files to be played in the establishment, each using their own portable computing device (i.e. phone). In some exemplary embodiments, the playlist queue may be composed in the order in which the selections are received by the media server from the customers.

In some exemplary embodiments, an establishment may define or otherwise maintain a supplementary playlist queue for periods of time when there are no currently playing or currently pending customer-selected media files. During such periods of times, media files may be selected from a supplementary playlist queue of the establishment.

The media server may automatically select media files from the supplementary playlist queue when there are no customer-selected media files pending for play. In alternate exemplary embodiments, an automatic selection mechanism may be employed for randomly or intelligently selecting media files from a pool of media files during periods of time when there are no currently playing or pending customer-selected media files.

Such mechanisms enable media files to be seamlessly played during periods when customers do not select media files. Advanced mechanisms for automatic media selection are disclosed in co-pending patent applications by the present inventor and have been incorporated by reference herein as described in the Cross Reference Section of this disclosure. In some exemplary embodiments, the media menu is updated regularly, excluding media files that are currently pending upon a playlist queue for that establishment and/or excluding items that have recently played within the establishment, for example have played within the last three hours. This prevents a customer from selecting a media file that has already been selected by another customer and is currently pending play (or has recently played within the establishment.)

In other exemplary embodiments, customers are enabled to select a media file that is currently pending for play in an identified establishment. Rather than the repeat-selected media file being added again to the playlist queue for the identified establishment, the routines of the media server are enabled to move the repeat-selected media file upward towards the top of the playlist queue, bypassing other media files that were previously selected but not repeat-selected. In this way, multiple customers independently selecting the same media file for play within the same establishment within a close time proximity, has the effect of increasing the priority of that media file within the currently pending playlist queue for that establishment. In some such exemplary embodiments, each additional time that a customer selects the same media file for play within the same establishment while it is pending upon a current playlist queue for that establishment, the priority level for that media file is increased and the media file is moved higher upon the pending playlist queue.

Such a configuration has the social effect of enabling a plurality of separate customers to collaboratively move a selected media file higher upon a pending playlist queue for an identified physical establishment. In some such exemplary embodiments, each customer who submitted an independent request for the prioritized media file is charged a fee upon play of the media file. This arrangement has the benefit of enabling a novel billing method in which a plurality of separate customers are each independently charged for the singular play of the same musical media piece within the same establishment. For example, if three customers independently request the same media file for play within the same establishment at a particular time, the repeat-selected media file is prioritized in response to having been selected multiple times, is moved up in the playlist queue ahead of previously selected songs that were not repeat-selected, and upon play, each of the three customers are each independently charged a selection fee for the media file. This, for example, earns three credits for the play of the media file rather than earning just one.

In some exemplary embodiments, the menu of media files available for play within a particular establishment may be configurable by an owner or operator of the establishment through a selection process engaged with the media server. For example, an owner or operator may identify a set of 500 songs that are available for selection by customers of the establishment. This set of songs may be defined as one or more data files stored upon the media server that are associated with the particular establishment.

This set of songs may be changed daily by the establishment to create variety in what is available for play within the establishment. This set of songs may also be updated regularly to include new music and remove old music. In this way, the media server enables a highly flexible definition of the set of songs that are available for selection by the customers of the establishment. In addition the owners and/or operators may print the current set of songs in a menu format for placement on the tables of the establishment. In this way, customers may view the current menu of available media in a convenient form, the printed menu including a unique identifier associated with each media file as described previously.

In some exemplary embodiments, a plurality of different media menus is distributed throughout an establishment, each with a different set of available musical media. In this way, a plurality of customers may view different portions of the total pool of available media within the particular establishment. This is particularly convenient in establishments where there is limited space to display printed media menus and yet a large pool of media is available for play.

In some exemplary embodiments, a media menu may be provided that also includes a unique artist identifier for each of a plurality of media artists such as singers and musical groups. In such embodiments, a customer may send an artist-specific media request to the media server that includes the unique artist identifier of a desired artist as well as a unique establishment identifier for the target establishment. In response to receiving such an artist-specific media request, the media server may be configured to select at random, or through another automatic process, a media file from the current media menu of the identified establishment that is performed by the artist corresponding to the unique artist identifier.

In this way, a customer may send a request to the media server, indicating for example, a desire that a Bruce Springsteen song be played within a particular establishment by sending an artist-specific media request that includes the unique artist identifier of Bruce Springsteen and the unique establishment identifier of the particular establishment. The media server, upon receiving the request, may be configured to select a Bruce Springsteen song at random from the pool Bruce Springsteen songs currently available for play within the particular establishment (i.e. from the pool of Bruce Springsteen songs currently on the media menu for that establishment), and add the randomly selected song to the current playlist queue for the particular establishment.

In some exemplary embodiments, the customers of an establishment may view the currently pending playlist queue, or a portion thereof, for that establishment upon their wireless computing device. In some such exemplary embodiments, the customer of an establishment may enter the unique identifier (and/or password) for the establishment into his or her portable computing device or receive the unique establishment identifier (and/or password) automatically upon his or her portable computing device when within the establishment through for example Wi-Fi, Bluetooth, and/or cellular telephone communication links.

The portable computing device may then send the unique establishment identifier (and/or password) for the localized physical establishment to the establishment media server which in response sends the current playlist queue, or a portion thereof, for that establishment to the portable computing device of that customer. The playlist queue may then be displayed upon a screen of that portable computing device, allowing the customer to see which songs, how many songs, and what order of songs, are currently pending for play within the establishment.

The customer may then review the pending playlist and repeat-select any pending media files that he or she wishes to move higher in the playlist queue. In this way, a customer can combine his request for a particular media file to the already pending request made by another customer for that same particular media file so as to collaboratively prioritize that particular media file, causing it to be played ahead of other pending media files that were selected prior the particular media file but not prioritized.

The customer may also review the pending playlist and indicate dissatisfaction with one or more pending media files within the playlist. Such an indication of dissatisfaction is referred to herein as a "rejection" of the pending media file and may be conveyed, for example, by the customer sending an electronic rejection message from his or her portable computing device to the media server, the electronic rejection message indicating which particular pending media file the customer is dissatisfied. In response to receiving a rejection message from a customer relating to a particular pending media file within the pending playlist for a particular establishment, the routines of an exemplary embodiment may be configured to either remove the pending media file from the pending playlist of the particular establishment, or move the pending media file lower on the pending playlist of the particular establishment such that it plays after songs that were selected at a later time than it was selected but which were not rejected by customers.

In some exemplary embodiments, a plurality of separate rejection messages for a particular media file pending for play within a particular establishment must be received from a plurality of separate customers in order for the routines to either remove the pending media file from the pending playlist of the particular establishment, or move the pending media file to a lower position on the pending playlist of the particular establishment. In this way, a plurality of separate customers of a particular establishment may collaboratively terminate the pending play and/or collaboratively de-prioritize the pending play of a particular pending media file within a pending playlist for the particular establishment. In addition, as will be disclosed later in this document, the same collaborative rejection process described for pending media file, may be used for a currently playing media file within a particular establishment.

The customer may also review the media menu for that establishment as he or she decides whether or not to add a song to playlist queue and/or what song to add. Thus, the customer may download from the media server the current pending playlist queue as well as listing of available songs from which to select. In some exemplary embodiments, the currently pending playlist queue may also be downloaded by a computer of the establishment and may be presented upon a screen of the establishment, for example a screen above a bar and/or at other convenient locations for viewers to view.

In some exemplary embodiments, a customer may download an establishment specific media menu by sending an encoded message to the media server including the unique establishment identifier for the establishment for which a media menu is desired as well including a menu request identifier. For example, in one embodiment a customer may download an establishment specific media menu by sending a text message to the media server including the menu request identifier "MENU" followed by the unique establishment identifier code for the establishment for which the media menu is desired.

Similarly, in some exemplary embodiments a customer may download an establishment specific playlist queue by sending an encoded message to the media server including the establishment identifier for the establishment for which a media menu is desired as well including a playlist request identifier. For example, in one embodiment a customer may download an establishment specific playlist queue by sending a text message to the media server including the playlist request identifier "PLIST" followed by the unique establishment identifier code for the establishment for which the playlist is desired.

Similarly, in some exemplary embodiments, a customer may receive an establishment specific playlist length from the media server by sending an encoded message to the media server including the establishment identifier for the establishment for which a media menu is desired as well including a playlist length request identifier. For example, in one embodiment a customer may download an establishment specific playlist queue by sending a text message to the media server including the playlist length request identifier "L" followed by the unique establishment identifier code for the establishment for which the playlist is desired. The media server responds by reporting the number of currently pending songs in the playlist queue for the identified establishment to the requesting customer's portable computing device. In some exemplary embodiments, the media server responds by reporting the total play time of currently pending songs in the playlist queue for the identified establishment to the requesting customer's portable computing device.

Customers are also afforded the opportunity to reject a playing or pending play musical media file within an establishment by entering a rejection code or other dissatisfaction indicia into the customer's portable computing device. In some embodiments a rejection code may comprise a binary value indicating a customer's current dissatisfaction with a currently playing or pending play musical media file. For example, the rejection code may be a direct indication of a customer's yes-or-no desire to have a currently playing or pending play musical media file be terminated from a playlist queue. In other embodiments the rejection code may comprise an analog value indicating a customer's level of current dissatisfaction with a currently playing or pending for play musical media file on a scale of dissatisfaction. For example, the rejection code may include an analog value indicating a customer's level of desire to have a currently playing or pending for play musical media file terminated from a playlist queue. In some such analog embodiments, a rejection message may be such a coded message that contain an analog value that exceeds a certain threshold level of dissatisfaction and/or desire to have the currently playing or pending musical media file be terminated from a playlist queue.

In an exemplary embodiment, one or more rejection messages must be received from portable computing devices in order to cause the currently playing media file to cease playing. For example, a media server can be configured to cease playing the current media file when three or more separate rejection messages are received from different customers. In this way, a plurality of customers in an establishment must independently send an electronic message to the media server indicating dissatisfaction with a currently playing media file. This creates a social and collaborative paradigm in which customers must work together to cease the playing of a currently playing media file within the establishment.

Upon receiving the required plurality of electronic rejection messages indicating dissatisfaction, the media server ceases the play of the currently playing media file and begins the play of a next media file in the play queue. The next media file may be selected from a pending playlist or may be automatically selected from a plurality of stored media files. The transition between the terminated media file and the next media file may be modulated smoothly such that the ceased media file is faded out prior to the next media file beginning to play. In some exemplary embodiments, a whimsical or iconic sound such as a toilet flush or gong sound may be played upon ceasing a media file to inform customers that it was terminated due to customer dissatisfaction. In some exemplary embodiments the customers, are charged a fee for the electronic messages sent requesting play rejection. In an exemplary embodiment, the customers can only send electronic messages if they subscribe to a paid subscription service. In one exemplary embodiment the media server receives the electronic rejection messages as SMS text messages sent from the portable computing devices of the customers in the establishment. In this exemplary embodiment, the customers are charged a fee per SMS message sent to the media server.

In some exemplary embodiments, the SMS message includes a coded indication of dissatisfaction and a coded indication of a particular establishment, the media server being operative to relationally associate the indication of dissatisfaction with the then-currently-playing media file within the particular establishment. In this way, a customer need not uniquely identify the particular song, but only uniquely indicate which establishment within which it is currently playing. The media server can make this association because it maintains a regularly updated data store indicating which media files are currently playing within which establishments.

In various exemplary embodiments, where the rejected media file was selected by a customer, the selecting customer is refunded his or her selection fee upon termination by other customers. The selecting customer may also be sent an electronic message from the media server indicating that the song was terminated in response to rejections from other customers. In some exemplary embodiments, the electronic message may indicate the number of customers that sent rejection messages resulting in the termination of the song. In this way, a selecting customer is given feedback as to the rejection of a song that he or she selected, the feedback optionally including an indication of the number of rejection messages received relating to the selected media file.

Referring to FIG. 1, a generalized block diagram of a computer system 100 is depicted. The computer system 100 may be configured as an establishment media player that plays media to customers within a physical establishment in response to data received from a media server 200. The computer system 100 may also be configured as a media server that receives wireless messages from customers within one or more establishments and coordinates media play within the one or more establishments. The computer system 100 may also be configured as a portable computing device used by each of the customers to select media files and exchange data with the media server. The computer system 100 includes a communications infrastructure 90 used to transfer data, memory addresses where data files are to be found and transfer control signals among the various components and subsystems associated with the computer system 100.

A processor 5 is provided to interpret and execute logical instructions stored in the main memory 10. In one exemplary embodiment, the processor 5 may be of a general purpose type commonly associated with desktop computer systems. In another exemplary embodiment, the processor 5 may be application-specific integrated circuit (ASIC) which is programmed to perform a particular function. In this exemplary embodiment, an ASIC processor may be used to output audio media or control portable computing devices, for example cellular telephones. In an exemplary embodiment, the processor 5 is programmed to execute the processes described in FIGS. 3 and 4.

The main memory 10 is the primary general purpose storage area for instructions and data to be processed by the processor 5. The term "main memory" 10 is used in its broadest sense and includes RAM, EEPROM and ROM. The main memory 10 is a type of computer readable storage media.

A timing circuit 15 is provided to coordinate activities in near real time. The processor 5, main memory 10 and timing circuit 15 are directly coupled to the communications infrastructure 90. The timing circuit 15 may be used for a number of different functions, including counting the number of times a media file is played or rejected.

A display interface 20 may be provided to drive a display 25 associated with the computer system 100. The display interface 20 is electrically coupled to the communications infrastructure 90 and provides signals to the display 25 for visually outputting both graphical displays and alphanumeric characters. The display interface 20 may include a dedicated graphics processor and memory to support the displaying of graphics intensive media. The display 25 may be of any type (e.g., cathode ray tube, gas plasma) but in most circumstances will usually be a solid state device such as liquid crystal display (LCD) or light emitting diode display (LED.)

A secondary memory subsystem 30 is provided which houses retrievable storage units such as a hard disk drive 35, a removable storage drive 40, an optional logical media storage drive 45 and an optional removal storage unit 50. One skilled in the art will appreciate that the hard drive 35 may be replaced with a flash memory drive.

The removable storage drive 40 may be a replaceable hard drive, optical media storage drive or a solid state flash RAM device. The logical media storage drive 45 may include a flash RAM device, an EEPROM encoded with playable media, or optical storage media (CD, DVD). The removable storage unit 50 may be logical, optical or of an electromechanical (hard disk) design. The secondary memory subsystem 30 is another type of computer readable storage medium. A communications interface 55 subsystem is provided which allows for standardized electrical interfacing of peripheral devices to the communications infrastructure 90 including, networking, serial, parallel, USB, and Firewire™ connectivity.

For example, a user interface 60 and one or more transceivers 65A,B may be electrically coupled to the communications infrastructure 90 via the communications interface 55. For purposes of this specification, the term "user interface" 60 includes the hardware and operating software by which a customer interacts with the computer system 100 and the means by which the computer system 100 conveys information to the customer and may include the display interface 20 and display 25.

In an exemplary embodiment, the computer system 100 may be configured as a media player that is outputting music and/or other media content to customers in proximity to a physical establishment such as a restaurant, bar, coffeehouse, retail store, or gym. In this exemplary embodiment, the user interface 60 is generally configured by restaurant employees; for example, the employees may adjust the sound volume being outputted by the computer system 100. The user interface 60 employed on the computer system 100 may include a pointing device (not shown) such as a mouse, thumbwheel or track ball, an optional touch screen (not shown); one or more push-button switches 60A, 60B; one or more sliding or circular potentiometer controls (not shown) and one or more other types of switches (not shown.)

The user interface 60 provides interrupt signals to the processor 5 that may be used to interpret customer interactions with the computer system 100 and may be used in conjunction with the display interface 20 and display 25. One skilled in the art will appreciate that the user interface devices which are not shown are well known and understood. In this way, the establishment employees may interact directly with the computer system 100 and input configuration information.

The first transceiver 65A facilitates the remote exchange of data and synchronizing signals between the computer system 100 and other devices in processing communications 85A with the computer system 100. The first transceiver 85A is intended as a general purpose networking transceiver which is generally compatible with IEEE networking standards for example, IEEE 802.11, 802.16, 802.22. Alternately, digital cellular communications formats compatible with for example GSM, 3G, CDMA, TDMA and evolving cellular communications standards. Both peer-to-peer (PPP) and client-server models are envisioned for implementation of the various inventive embodiments. The second transceiver 65B is intended as a short range transceiver for example, a Bluetooth™ transceiver or an RFID scanner and a local wireless network. In a third alternative embodiment, the transceiver 65A may include hybrids of computer communications standards, cellular standards and evolving satellite radio standards, as well as via a public switched telephone network (PSTN.)

In an exemplary embodiment, the second transceiver 65B is of a shorter range type than the first transceiver 65A. One exemplary implementation of the second transceiver 65B is used to determine which customers are actually present in an establishment. In this exemplary embodiment, the second transceiver 65B is generally a Bluetooth™ or infrared transceiver. In another exemplary embodiment, the second transceiver 65B is incorporated into a radio frequency identifier (RFID) scanner. In this exemplary embodiment, the RFID scanner determines which customers are present based on transponded identifier codes. The RFID scanner may be disposed at a portal 202 (FIG. 2) of the establishment and may be used to track customers entering and leaving the establishment. In such exemplary embodiments, an RFID tag is present on the person of each customer, the tag encoded with a unique identifier for that customer and/or for the portable computing device of that customer.

Alternately, an RFID scanner may be employed within or upon the portable computing devices of customers. In such exemplary embodiments, one or more RFID tags may be positioned within establishments that include the unique identifier for the establishment. In this way, a portable computing device of a customer may automatically access the unique identifier of an establishment to which the customer is locally present. Barcodes may be used as well, an bar code scanner and/or a camera configured to act as a bar code scanner, of the portable computing device, being used to scan barcodes within an establishment that encode the unique establishment identifier EID 150 (FIG. 2) of the establishment.

In an optional exemplary embodiment, a satellite receiver 70 is operatively coupled to the communications infrastructure 90. The satellite receiver 70 is configured to receive satellite signals 85C. A more detailed discussion is provided below accompanying the discussions provided for FIGS. 2, 2A and 2B.

Figure 2:
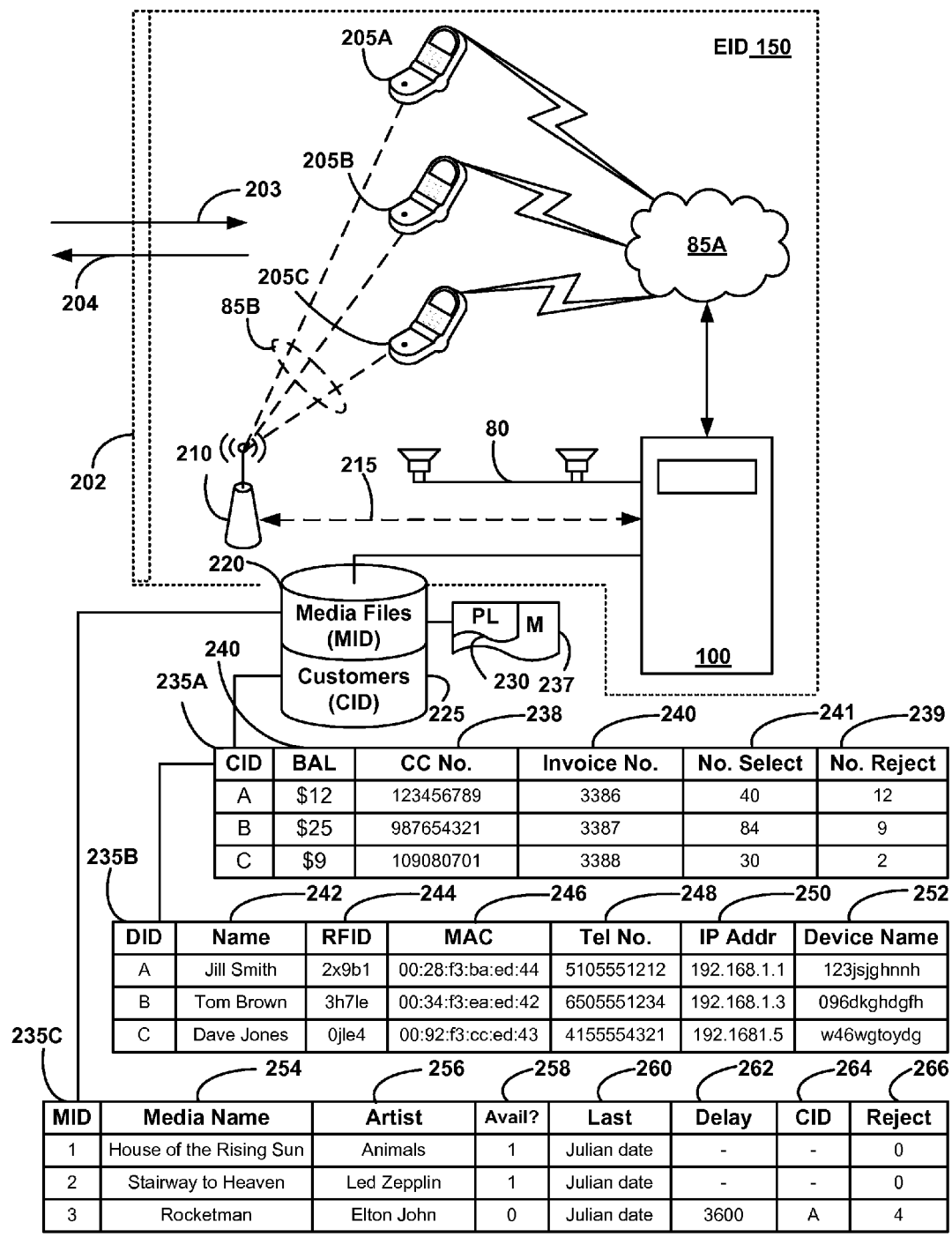
FIG. 2—depicts an exemplary block diagram of a computer system configured as a media player in processing communications over at least one network with a plurality of wireless portable computing devices.

In an exemplary embodiment, the computer system 100 may be configured as a local media server and/or a media player (FIG. 2). In another exemplary embodiment, the computer system 100 may be configured as a remote media server 200 (FIG. 2A) that is maintained by a third party service provider and located offsite from each physical establishment. In this exemplary embodiment, the media player 100 communicates with the media server 200 over a communication network such as the Internet 85A. In general, the media server 200 is configured to service a plurality of physical establishments, each with its own local media player 100 that communicates with the media server 200 over a communication network such as the Internet 85A.

The communication link 85A may be wired, wireless, or a combination of wired or wireless. The first transceiver 65A may also facilitate the remote exchange of data between the local media player 100 and a plurality of portable computing devices 205A,B,C associated with customers and generally containing personal data about that customers. In various exemplary embodiments, the plurality of portable computing devices 205A,B,C communicate over a wireless communication link such as a cellular network 85B, to the media server 200. In an exemplary embodiment, the cellular network 85B is connected to a public packet switched network 85A via a gateway 85D operated by the cellular provider or another third party provider.

Lastly, the local media player 100 includes an audio processing subsystem 75. The audio processing subsystem 75 is electrically coupled to the communications infrastructure 90 and provides for the output of media, for example, multimedia encoded in any of the exemplary formats MP3, AVI, WAV, MPG, QT, WMA, AIFF, AU, RAM, RA, MOV, MIDI, etc. The audio processing subsystem 75 is operatively coupled to one or more audio output devices, generally speakers 80. The speakers 80 may be disposed in various locations within the establishment to optimize acoustics. The speakers 80 may be coupled to the audio processing subsystem 75 by traditional cabling and wireless arrangements such as Bluetooth™. In addition, the audio processing subsystem 75 is envisioned to optionally include features such as graphic equalization, volume, balance, fading, base and treble controls, surround sound emulation, and noise reduction. One skilled in the art will appreciate that the above cited list of file formats is not intended to be all inclusive.

The media player 100 includes an operating system, the necessary hardware and software drivers necessary to fully utilize the devices coupled to the communications infrastructure 90, media playback and the data access programs for sending and/or receiving data from the media server 200 and/or from the portable computing devices 205A,B,C.

Referring to FIG. 2, an exemplary block diagram is depicted in which a computer system 100, configured as a local media server is in processing communications over at least one network 85A with a plurality of wireless portable computing devices 205A,B,C. For simplicity and ease of understanding, the computer system 100 will be referred to herein after as a media player 100.

Figure 2A:
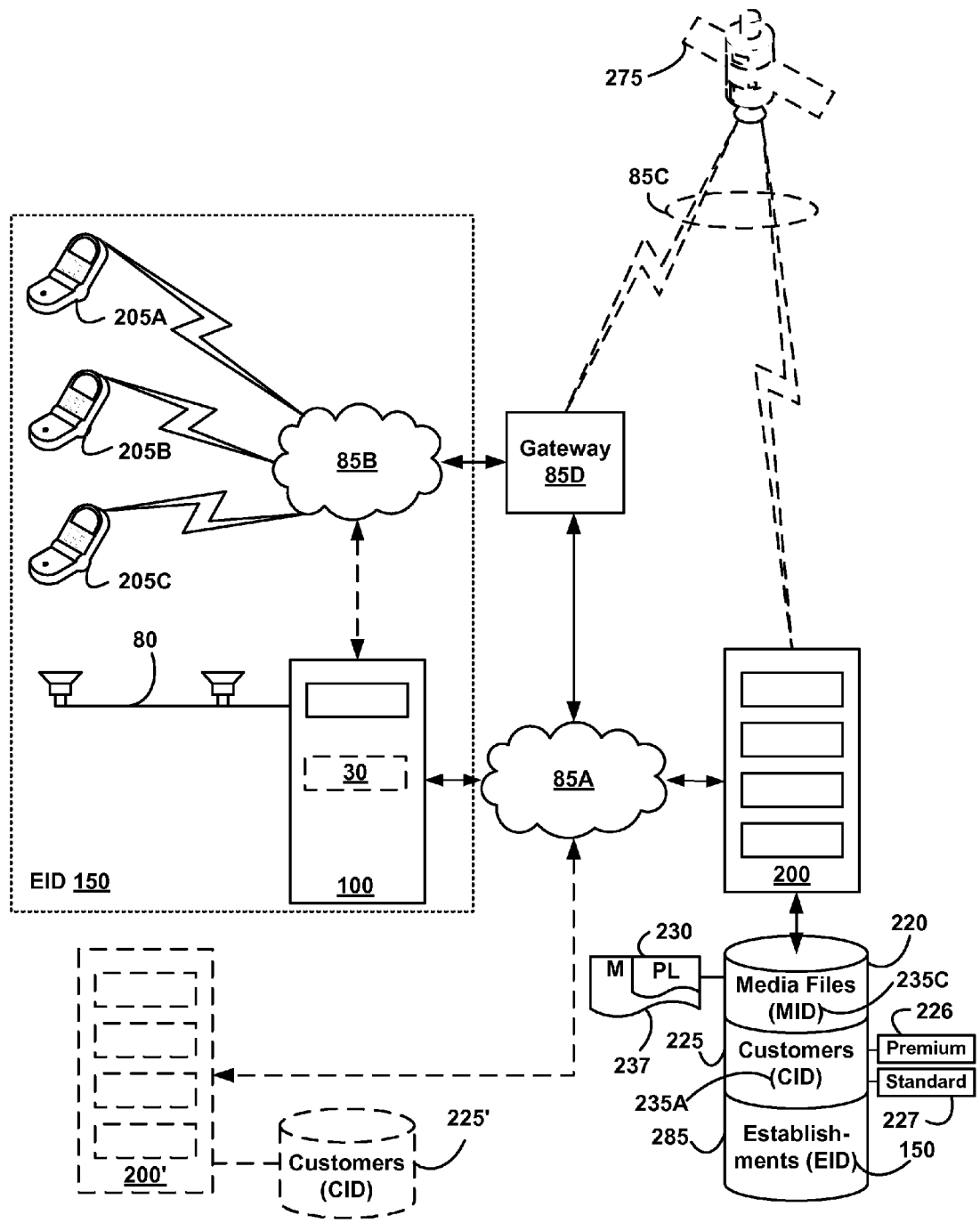
FIG. 2A—depicts an exemplary block diagram in which a remote media server is in processing communications over at least one network with a media player and a plurality of wireless portable computing devices.

In a first exemplary embodiment, the network 85A is one or more public networks connected together by various gateways 85D (FIG. 2A.) For example, cellular telephone networks with a gateway to the Internet. In this exemplary embodiment, the plurality of wireless portable computing devices 205A,B,C comprise intelligent cellular telephones which are configured to send and receive short messaging service (SMS) or instant messaging (IM) text messages to the media player 100. In order to communicate with the media player 100, the establishment 150 provides instructions to the customers with an address of the media player 100. The address may be an SMS address, IM address, "short code", phone number, handle or other unique identifier which is accessible over the public network 85A. Using the address provided by the establishment 150, each customer sends a message from their portable computing devices 205A,B,C to the media player 100.

Customers who are new to the establishment, or have changed identifying information may be prompted to fill out a brief registration request sent by the media player 100. The registration information may include demographic information about the customer and/or preference information of the customer, for example age, gender, clothing size, musical preferences, and/or food preferences. The registration information is stored in a customer database 225. Established customers and those who have completed the brief registration process may then be provided a media menu 230 of media 220 available for selection and play by the media player 100. The registration process may include the customer's name 242, media access control code 246 of the portable computing device, the customer's telephone number 248, internet protocol address 250, a device or customer name 252. In an exemplary embodiment, each customer is assigned a unique customer identifier code CID 235A and where necessary, each portable computing device is assigned a unique device identifier DID 235B.

The registration process may also include a credit or debit card number 238 which allows the establishment 150 to charge the customer for utilizing the collaborative selection service. In an exemplary embodiment, the charges may be added to an invoice 240 of the establishment 150. For example, charges for using the collaborative selection and rejection service may be added to a balance 240 for meals and drinks. The number of media files selections 241 and rejections 239 may also be maintained in a database. In such exemplary embodiments, the customer may enter a unique table number, seat number, or other locative identifier EID 150 with respect to the establishment, into his or her portable computing device 205A,B,C as a way of associating that customer with a pending bill food and drink services.

In many exemplary embodiments, charges for media selections are billed using a reverse SMS billing process that adds the SMS messaging charge to the customer's existing phone bill associated with his or her portable computing device 205A,B,C. In an alternate exemplary embodiment, an SMS billing process which utilizes a third party financial service, for example, PayPal™ may be employed as well.

The media menu 237 includes the names of media files 254 that are currently available for play in the establishment. To simplify the selection process, the media files 254 may be selected by entering a unique code MID 235C associated with each media file 254. The media menu 237 may also include such information as the name of the artist 256, whether the selection is still available 258 (i.e., not already selected by another), the last time the media file was played 260, a predetermined delay 262 to bar the replay of a recently played media file 254 and optionally the unique customer identifier 264 who last selected the media file for play. The media player 100 may also maintain statistics of the number of rejections 266 received for the play of each media file in the media menu over a period of time. The media player 100 may also maintain statistics of the number of rejections 266 received for selections made by each customer. The statistics stored for each customer may include an indication of the media files suggested by those customers as well as an indication of which media files were rejected by other customers (not shown.) In this way, data is stored about what selections were made by each customer and whether those selections were collaboratively rejected by other customers.

In an exemplary embodiment, a score may be kept for customers indicating the percentage of their selections that were rejected by other customers and/or the percentage of their selections that were not rejected by other customers. The customers having low rejection rates may be rewarded by the media server by providing a free credit and/or other monetary advantage to such customers in return for maintaining a low rejection rate for a period of time. This encourages customers to select songs for play that they believe will be well accepted by the customers of an establishment. This may also discourages customers from selecting unpopular songs for play. In an exemplary embodiment, a customer may request a report of his or her rejection rate 221 (FIG. 2C.) In response to receiving such a message, the media server 100 will calculate the rejection rate for that customer, indexed by the customer's unique identifier CID 235A, and report a representation of that value to the portable computing device 205A.B,C for the requesting customer 221 (FIG. 2C.)

A playlist queue 230 may also be provided which contains those media files 220 pending to be played by the media player 100. Each customer entry may also be indexed using a unique customer identifier CID 235A which allows cross referencing or indexing of a customer's information among a plurality of data tables. Once the media files have been selected, the media player 100 plays the selected media files from the playlist queue 230 which are output to the audio output devices 80. In general, selected media files are added to the playlist queue 230 in sequential order by the media player 100.

In a second exemplary embodiment, the network 85A is a local wireless network, for example, an IEEE 802.11a,b,g,n operated by the establishment. As previously described, the plurality of wireless portable computing devices 205A,B,C comprise intelligent cellular telephones which are configured to send and receive short messaging service (SMS), E-mail or instant messaging (IM) text messages to the media player 100. In order to communicate with the media player 100, each of the wireless portable computing devices 205A,B,C establish communications over the local network 85A with the media player 100. However, unlike the public network embodiment described above, much of the unique device identifier information DID 235B is incorporated into the wireless communications protocols. For example, the MAC 246, assigned IP address 250 and/or device name 252 are parameters normally available over IEEE 802.11a,b,g,n conforming wireless networks.

For new customers or customers with information changes, an analogous registration process may be performed to populate the required information of the customer database 225. The selection and playing of musical media files is accomplished as before using SMS, E-mail IM text messaging, or other forms of electronic messaging.

In an exemplary embodiment, a second communications link 85B is provided. In this exemplary embodiment, the second communications link 85B is a Bluetooth link coupled 215 to the media player 100. In this exemplary embodiment, the Bluetooth link 85B may be used as a local proximity sensor 210 disposed at a portal 202 of the establishment 150. Since the Bluetooth protocol is intended as a short range communication link 85B, the presence or absence of a Bluetooth signal may be used to determine which customers are present within the establishment 150.

In addition, the Bluetooth link 85B may also be used to send and receive electronic messages between the portable computing devices 205A,B,C, and the media player 100 as is described above for the wireless network 85A. In this exemplary embodiment, the transceiver 210 may be installed within the physical establishment 150 to detect the presence of the portable computing devices 205A,B,C when they are within a certain area 202 associated with the establishment. In this way, the media player 100 may automatically register customers as they ingress 203 into the establishment 150 and unregister customers as they egress 204 the establishment. Ingressing 203 customers would automatically receive the establishment's media menu 230 communicated by the media player 100 over the Bluetooth link 85B or wireless network 85A.

In another exemplary embodiment, the second communications link 85B is an RFID transponder signal. The sensor 210 may comprise an RFID scanner. In this exemplary embodiment, new customers are provided with a small RFID tag which may be affixed to their portable computing devices 205A,B,C by an adhesive sticker. The new customer then registers his or her portable computing devices 205A,B,C over the wireless network 85A as previously described. Once registered, returning customers may be automatically detected when ingressing 203 through a portal 202 and unregistered when egressing 204 the portal 202, analogous to the Bluetooth arrangement described above. The RFID scanner 210 outputs 215 the detected unique identifier of each RFID tag detected to the media player 100. The media player 100 identifies the customer associated with the unique identifier. The customer information stored in the customer database 225 is then used to send the establishment's media menu 230 over the wireless network 85A to the customer's portable computing devices 205A,B,C.

In alternate exemplary embodiments, the RFID scanners are integrated into the portable computing devices 205A,B,C and the RFID tag is affixed to a location within the establishment. In such an exemplary embodiment, the portable computing devices 205A,B,C are configured to automatically detect the unique identifier of an establishment EID 150 that is entered by scanning the RFID tag that is physically associated with the establishment. The unique establishment identifier is thereby read by the portable computing devices 205A, B,C.

Referring to FIG. 2A, an exemplary block diagram is depicted in which media player 100 is in processing communications over at least one network 85A with a remote media server 200. In addition, the media server 200 is in processing communications over one or more networks 85A,B with a plurality of wireless portable computing devices 205A,B,C, typically by way of a gateway 85D. In some optional exemplary embodiments, the portable computing devices 205A, B,C may also be configured to communicate directly with the media player 100 over a local wireless network 85B and/or with an alternate local wireless network that acts as a gateway 85D to a public network 85A such as the Internet. In an exemplary embodiment, the media player 100 is configured to receive playlist data 230, unique media identifiers MID 235C, and/or streaming media from the media server 200 based upon selections received by the media server 200 from the portable computing devices 205A,B,C.

Figure 2B:
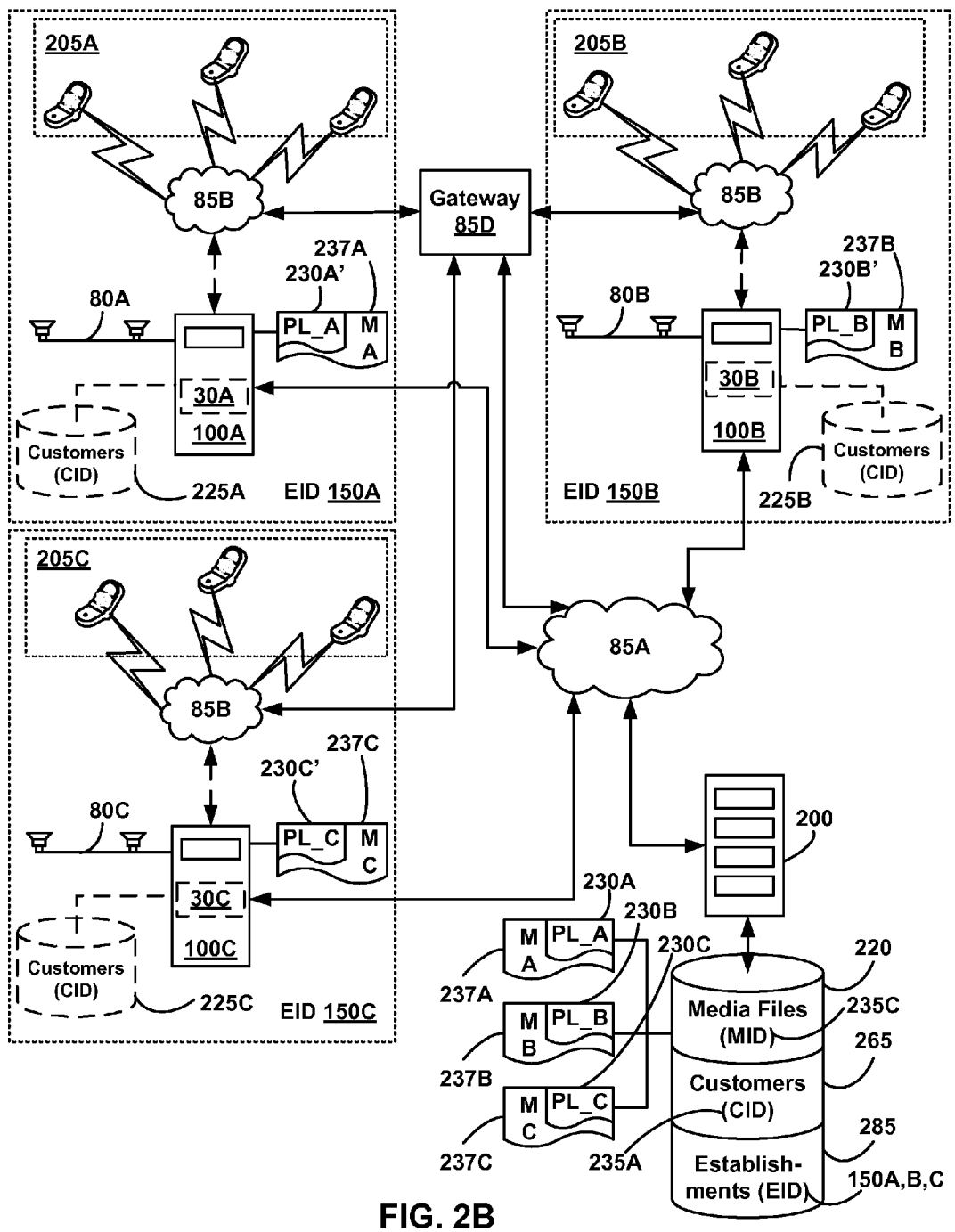
FIG. 2B—depicts an exemplary block diagram in which a plurality of media players, each associated with a separate physical establishment, is in processing communications over a network with a remote media server.

In an exemplary embodiment, the musical media files are stored locally to the media player 100, and is accessed and played by the media player 100 in response to unique media identifiers MID 235C received from the media server 200 over the communication network 85A. In this way, the media server 200 is operative to orchestrate the local play of the media files by the media player 100. As shown in FIG. 2B, the media server 200 may be configured to independently orchestrate the local play of media content by a plurality of separate establishment media players 100A,B,C, each associated with a separate physical establishments 150A,B,C. In this way, a plurality of establishment media players 100A,B,C, each associated with a unique establishment identifier EID 150A, B,C may independently play musical media that has been uniquely selected by customers of that establishment 150, under the coordination of a centralized media server 200.

In an exemplary embodiment, the local media player 100 is not directly involved in moderating the selection of media files or handling billing transactions associated with the selection of media files. Instead the media player 100 may be configured to output 80 musical media under the coordination of the media server 200 which moderates the selection process among customers and coordinates any associated billing transactions. In some such exemplary embodiments, each customer establishes an account 225 with a third party provider 200 which operates the media server 200. Each customer's account is maintained in a remote database 225 as are the media files for selection 220. Upon arriving at a properly configured establishment 150, each customer wishing to select media for public play within the establishment 150 sends an electronic message, for example an SMS text message, using their portable computing devices 205A,B,C, to the media server 200. The customer accounts may be stratified using various account privileges. For example, customers may have the option to select a premium status level 226 which affords greater privileges than those of a standard level customer 227.

The electronic message includes a unique identifier associated with the establishment EID 150 as well as a unique media identifier associated with each media file that the customer desires to have played within the establishment. In this way, the media server 200 receives an indication that a particular customer, generally identified by the electronic address of their portable computing device (i.e. their phone number or text messaging address), desires that a particular song (identified by a unique media identifier MID 235C), be played or rejected in a particular establishment (identified by the unique establishment identifier EID 150). The media server 200 then adds the selected media file to the currently pending playlist queue 230 of the identified establishment 150. The media server 200 may also be configured to send a media menu 237 of available media files for a particular identified establishment 150 to a requesting portable computing devices 205A,B,C.

In an exemplary embodiment, the media menu 230 may be a subset of all available media files 220 in the database which has been customized for the particular identified establishment 150 to limit customer selections to media files suitable for play within that establishment 150. For example, the media menu 230 for a particular establishment 150 may be limited to a genre, screened for adult content, limited in length of play, screened for recently played media files, etc. In this way, each unique establishment 150 may define a unique media menu 230 that defines the pool of media selections available for play within that establishment. In some such exemplary embodiments, the media menu may not be sent electronically to customers, but instead may be provided in printed form, for example on tables, as described previously.

In this way, an establishment such as a restaurant or gym may prevent customers from selecting inappropriate media files for play in that establishment. For example, a limited menu 237 may be provided, either electronically or physically, to customers of the establishment such that the customers may only select media files off a limited menu 237. In an exemplary embodiment, the establishment media player 100 of each establishment 150 has access to a local datastore 30 that contains the media content of all media files that are available for selection within the media menu 230 for that particular establishment 150. In this way, the media server 200 maintains a listing 230 of all media files available for play within a particular establishment 150, the media player 100 of that establishment having locally access to it, the media content for each song on that menu 237.

When it is time to play a particular media file within a local establishment 150, as determined by the playlist queue 230 for that particular establishment that is maintained upon the media server 200, a media identifier MID 237C is sent from the media server 200 to the media player 100 of that establishment 150. In response to receiving the unique media identifier 237C, the establishment media player 100 locally accesses 30 and plays the identified media file. In this way, the media server 200 is operative to maintain a playlist queue 230 for the establishment 150 and coordinate in accordance with the playlist queue 230, the local play of media within the establishment 150 as output by the media player 100 of that establishment.

The playlist queue 230 for each establishment is generated, at least in part, based upon electronic messages received from the portable computing devices 205A,B,C as described previously. In this way, the media server 200 is operative to enable customers to select particular songs to be added to a playlist queue 230 associated with a particular establishment 150 and then coordinate the execution of by the local media player 100 in that establishment.

In an exemplary embodiment, the media content of the customer selected media files may be streamed to the media player 100 if it is not locally available to the media player 100 at the time the media file is required for play as defined by the playlist queue 230 associated with that establishment 150. The streamed media content may be sent over the high speed network 85A, over cellular communication connections 85B, or downloaded from a satellite 275 over a satellite communication connection 85C.

In an exemplary embodiment, the remote media server 200 is coupled to another remote server 200' over the network 85A. In this exemplary embodiment, the remote server 200' is that of a financial services company, for example a debit or credit card transaction server where each of the customers has an established account 225'.

Referring to FIG. 2B, an exemplary block diagram is depicted in which a plurality of local establishment media players 100A,B,C are in processing communications over a network 85A with a remote media server 200, each establishment media player 100A,B,C servicing a separate physical establishment and being associated with a separate unique establishment identifier 150A,B,C or other unique identifier. Each media player 100A,B,C may also have a local datastore incorporated therewith 30A,B,C. In this exemplary embodiment, each establishment 150 enters into an agreement with a media providing service. The media providing service allows customers to select, using their portable computing devices 205A,B,C, media files for public play within each establishment 150A,B,C under the coordination of the media server 200.

This coordination is achieved by the media server 200 maintaining a unique media menu 230A,B,C and a unique pending playlist queue 230A,B,C for each establishment 150A,B,C the playlist 230A,B,C for each establishment being generated, at least in part, in response to customer selections received for that particular establishment from the media menu 237A,B,C for that establishment. The customer selections are sent as electronic messages from the portable computing devices 205A,B,C to the media server 200 over an intervening communication network such as a cellular network 85B. In an exemplary embodiment, the portable computing devices are cellular telephones and the electronic messages are SMS text messages that encode the unique establishment identifier EID 150A,B,C for the establishment as well as the unique media identifier MID 237C that is being selected.

In some exemplary embodiments, the SMS message includes a coded indication of dissatisfaction and a coded indication of a particular establishment 150A,B,C, the media server 200 being operative to associate the indication of dissatisfaction with the then-currently-playing media file within the particular establishment. In this way, a customer need not uniquely identify the particular song that is currently playing in an establishment when expressing dissatisfaction in the form of a rejection message, but only uniquely indicates which establishment 150A,B,C within which it is currently playing. The media server 200 can make this association because it maintains a regularly updated datastore indicating which media files are currently playing within which establishments.

Each customer may then be charged for each media file requested for public play within an identified establishment 150A,B,C and/or for each media file rejected within an identified physical establishment 150A,B,C. The fee may be charged upon the request and/or rejection being processed, or upon actual play and/or termination of the identified media file within the identified physical establishment. The termination of a currently playing or pending play media file results in a credit being provided to the originally selecting customer's account; thereby refunding the requesting customer for a selected media file that is terminated prior to full completion as a result of received rejection messages from other customers. In addition, the termination of a currently playing or pending media file results in a charge being levied against each of the rejecting customer(s) account(s) in the customer database 265. In this way, the selecting customer is refunded if his or her song is terminated by other customers, and the rejecting customers are charged. This creates a unique payment paradigm for collaborative selection and rejection of media files within physical establishment.

Alternately, each customer may pay a subscription charge. In either case, the establishment 150A,B,C may be provided a percentage of the fees generated as a result of media selections made for that establishment. In this way, each establishment 150A,B,C is provided with a monetary incentive to enable such a customer media selection service within their establishment (i.e. their restaurant, bar, gym, or retail store).

In an exemplary embodiment, an establishment 150A,B,C may define or otherwise maintain supplementary playlist queues 230A',B',C' for periods of time when there are no currently playing or currently pending customer-selected media files. During such periods of times, media files may be selected from the supplementary playlist queues 230A',B',C' of the establishments 150A,B,C. The supplementary playlist queues 230A',B',C' for the establishments 150A,B,C may be maintained upon the media server 200 or upon the local establishment media players 100A,B,C.

In an exemplary embodiment, the media server 200 may generate a supplemental playlist queue for an establishment by automatically selecting media files from media menu 230A,B,C for that establishment when there are no customer-selected media files pending for play. In another exemplary embodiment, an automatic selection method may be employed for randomly or intelligently selecting media files from the pool of media menu files during periods of time when there are no currently playing or pending customer-selected media files. Such methods enable media to be seamlessly played during periods when customers do not select media files. It should be noted that in some exemplary embodiments, customers may cause the early termination of automatically selected media files using the same or similar collaborative rejection methods as described herein for customer selected media files.

As previously described, some exemplary embodiments enable a customer to download the media menu 237A,B,C onto his or her portable computing device 205A,B,C and may review the menu and interactively select one or more media files for play from the list. In some exemplary embodiments, the media menu is updated regularly, excluding items that are currently pending upon a playlist queue 230A,B,C for that establishment. In some exemplary embodiments, the media menus 237A,B,C are regularly updated to exclude media files that have recently played within an establishment 150A,B,C for example, having been played within the last 3 hours.

In some such exemplary embodiments, the media items 220 that are currently excluded for selection may appear on the representation of the media menu 237A,B,C that is displayed to a customer on his or her portable computing device, but may be depicted as grayed-out or otherwise be visually identified as being non-selectable at the current time. In this way, a customer may view the entire media menu 237A,B,C for a particular establishment 150 on his or her portable computing device, but is given a clear visual indicator as to which media items are currently available for selection, which media files have been rejected and which media files that are not available for selection.

This arrangement assists a customer in the selection of songs that are currently available for play, while also informing the customer as to songs that may be available at other times within the establishment. The modification of the media menu 237A,B,C of a particular establishment 150A,B,C, for example to exclude media files from selection that have recently played within that establishment 150A,B,C, have been repeatedly rejected, or to exclude media files from selection that are currently pending for play within that establishment, helps prevents a customer from selecting a media file that has already been selected by another customer, is generally disfavored or is currently pending play (or has recently played within the establishment 150A,B,C.)

In other exemplary embodiments, customers may select a media file that is currently pending for play in an identified establishment 150A,B,C. Rather than the repeat-selected media file being added again to the playlist queue 230A,B,C for the identified establishment 150A,B,C, the programmatic instructions of the media server 200 are enabled to move the repeat-selected media file upward towards the top of the playlist queue 230A,B,C for that establishment, bypassing other media files that were previously selected but not repeat-selected. In this way, multiple customers using separate personal portable computing devices 205A,B,C may each independently select the same media file for play within the same establishment within a close time proximity and have the effect of increasing the priority of that media file within the currently pending playlist queue 230A,B,C for that establishment 150A,B,C.

In some such exemplary embodiments, each additional time that a customer selects the same media file for play within the same establishment while it is pending upon a current playlist queue 230A,B,C for that establishment, the priority level for that media file is increased and the media file is moved higher upon the pending playlist queue 230A,B,C. Such a configuration has the social effect of enabling a plurality of separate customers to collaboratively move a selected media file higher upon a pending playlist queue 230A,B,C for an identified physical establishment 150A,B,C.

In some such exemplary embodiments, each customer who conveys an independent request for the play of a media file that is prioritized in response to the multiple requests is charged a fee upon play of the media file. This arrangement has the benefit of enabling a novel billing method in which a plurality of separate customers are each independently charged for the singular play of the same musical media piece within the same establishment 150A,B,C.

For example, if three customers independently request the same media file 220 for play within the same establishment 150A,B,C at a particular time, the repeat-selected media file is prioritized in response to having been selected multiple times and is thereby moved up in the playlist queue 230A,B,C for that establishment so that it plays ahead of previously selected songs that were not repeat-selected. And upon play of the media file, each of the three customers who submitted requests for the media file are each independently charged a selection fee. This, for example, earns three credits for the play of a single media file rather than just one credit.

Conversely, a single credit of for example $0.20 may awarded to a customer whose media file was rejected by one or more other customers while three credits may be charged to each customer that rejects a currently playing or pending play media file. Thus, if three rejections are required to terminate a currently playing media file, three credits equaling for example $0.60 is earned for a rejection of a media file which results in a net gain of $0.40. In addition, the terminated media file allows another media file to be selected by customers to replace the rejected media file, further increasing the money making potential of the music moderating service.

In an exemplary embodiment, a customer may be billed for each electronic rejection message that he or she sends to the media server 200. In other embodiments, a customer may only be billed for electronic rejection messages that he or she sends to the media server 200 that actually results in the termination of a currently playing or a pending play media file.

In some exemplary embodiments, a plurality of rejection messages received for a currently pending media file within a playlist for a particular establishment results in the media server 200 moving the pending media file identifier lower on the pending playlist of the particular establishment such that it plays after songs that were selected at a later time than it was selected but which were not rejected by customers. In this way, a plurality of separate customers of a particular establishment may collaboratively de-prioritize the pending play of a particular pending media file within a pending playlist for the particular establishment.

In some such exemplary embodiments, rejection messages may de-prioritize a pending media file on a playlist for a particular establishment while repeat-selections may prioritize a pending media file on a playlist for a particular establishment. In such embodiments rejection messages and repeat-selection messages related to the same pending media file may be summed to result in a net prioritization change of the pending media file within the playlist queue for that establishment. This arrangement enables a plurality of customers to collaboratively repeat-select and/or reject the same pending media file on a playlist queue for a particular establishment and thereby collaboratively adjust the placement of the media file within the playlist queue for that establishment based upon a summation of the repeat-selection and rejection messages. In some exemplary embodiments, repeat-selection and rejection messages are equally weighted in the summation. In other exemplary embodiments, repeat-selection and rejection messages are unequally weighted in the summation.

In an exemplary embodiment, the media menu 237A,B,C of available media for play within a particular establishment 150A,B,C may be configurable by the owners or operators of the establishments 150A,B,C through a selection process engaged with the media server 200. For example, an owner or operator may identify a set of 500 media files 220 that are available for selection by customers of their respective establishments 150A,B,C. One skilled in the art will appreciate that the various customizations to the media menu 230A,B,C may be accomplished at the media player level 100A,B,C as well.

For example, an establishment 150A,B,C may define different media menus for different days of the week, times of day, months of the year, or seasons of the year. An establishment 150A,B,C may also update their media menu 237A,B,C regularly based upon customer feedback, changes in pop music charts, acceptance and/or rejection statistics 239, 266 (FIG. 2) or the release of new musical media.

In an exemplary embodiment, a customer who selects a media file for play may do so by paying a premium fee which prevents the selected media file from being rejected by other customers. For example, a customer may make a standard media request that costs a single credit, for example, $0.20 and have that media request added to the playlist 237A,B,C for an establishment 150A,B,C; the standard request being susceptible to rejection by other customers. However, the customer may also elect to make a non-premium media request which costs four credits, for example, $0.80 but cannot be rejected by other customers.

In an exemplary embodiment, the media server 200 may be configured such that a standard media request may be terminated in response to the receipt of a certain number and/or status level of electronic rejection messages received from customers. For example, the standard media request may be terminated in response to the receipt of three electronic rejection messages from individual customers. Conversely, a premium media request may be configured in a number of different ways. For example, a premium selected media file may be configured so as to prevent termination irrespective of the number of electronic rejection messages received from customers, thereby being guaranteed for full play; alternately, a premium media file selection may be configured such that only a premium status level rejection message may terminate the media file from play; or a premium media file selection may be configured such that a minimum number of premium status level rejection messages are required to terminate the media file from play.

In some exemplary embodiments, the higher a customer pays to select a particular media file for play within a particular establishment, the larger the number of rejection messages that are required to terminate the media file prior to complete play within the establishment. In this way, a customer may pay a higher selection fee for a media selection in return for creating a higher minimum threshold of the number of rejection messages required to terminate the media selection.

Referring to FIG. 2C, several exemplary interactions with a customer's portable computing device 205A,B,C is depicted. In an exemplary embodiment, a media server 200 sends a messaging causing a media file to play to a group of customers within an establishment 150A,B,C. In this example, the song is "Can't Touch This," by MC Hammer.

A customer in the establishment 150A,B,C upon hearing the song decides to request to cancel the play of the currently playing song by entering a rejection code into his or her portable computing device and/or otherwise causing the rejection code to be sent in a message to the media server 200. The customer also enters an establishment ID code 105C 207 for the establishment in which he is currently listening to the song ad/or otherwise causes the establishment ID code to be sent in a message to the media server. For example, the customer might type in "F" to his or her portable media player, followed by "6612" and then cause the coded message to be sent as an SMS message to the media server. The code "F" represents a request to FLUSH the media file that is currently playing within establishment "6612", ceasing it from continued play 206. The rejection code and the establishment ID code is sent over the network 85A to the media server 200 which causes the song that currently playing in the identified establishment to cease play prior to its normal full completion.

A response message 209 is sent from the media server 200 to the customers within the establishment 150A,B,C notifying them that the currently playing media file has been cancelled. In some exemplary embodiments, only the customer who rejected the song is notified by the media server. In other exemplary embodiments, the customers who sent rejection messages related to the terminated media file are also sent notification messages. In some exemplary embodiments, all customers that are known to be patronizing the identified establishment are sent the notification message. In an exemplary embodiment, the unique customer identifier CID 235A of the customer(s) who caused the cancellation of the media file is displayed 209 on each customer's portable computer device 205A,B,C. If multiple parties caused the rejection of the media file, a total number of rejections may replace the customer identifier. In this way, customers are informed as to the number of other customers who collaboratively worked together to cause the currently playing media file within the establishment to be terminated. Where necessary, the customer may be required to also enter a code for the specific media file to be cancelled to allow the media server 200 to complete the rejection.

The spaces and/or pound symbols may be used as delimiters by the media server 200. One skilled in the art will appreciate that there are many ways to implement the interpretation of the SMS text strings sent to the media server 200. In a further exemplary embodiment 208, the customer may be required to enter the rejection identifier, "F" followed by the unique media file identifier "6612" MID 235C of the media file to be cancelled, followed by the unique establishment identifier "6612" 105C 207 of the establishment in which the media file is playing and/or pending for play, and the A unique customer identifier CID to allow the media server 200 to complete the rejection.

In an exemplary embodiment, the response message 209 may include a whimsical statement such as the requested media file has been "FLUSHED". The whimsical statement may be accompanied by a sound effect which simulates the sound of a flushing toilet or the sound of a gong, the visual image of guillotine, a color change upon the display(s) of the portable computing devices 205A,B,C, a brief rendition of "Taps," and similar end of the line type concepts. In an exemplary embodiment, a whimsical and/or iconic sound may be played by media player 100 upon termination of the media file. The whimsical and/or iconic sound may be used as a transition between the terminated song and a next song in the media playlist queue. In this way, customers within the establishment are informed as to the termination of a song by the sounding of the whimsical and/or iconic sound by the media player 100.

In another exemplary embodiment, the media file may be one pending for play and observed on a pending playlist 212. In this exemplary embodiment, a customer whose portable computing device 205A,B,C is equipped with a graphical user interface (GUI) may scroll through the playlist 230A,B,C of pending or currently playing media files and selectively remove one or media files from the playlist 230A,B,C. In this exemplary embodiment, the customer may highlight the media file(s) to be rejected and simply enter the rejection code F or 'ENTER' (not shown) which is then sent as discussed above to the media server 200 for implementation as before. In such an embodiment, client software upon the portable computing device may be configured to automatically send a coded message to the media server 200, indicating which media file for pending play within which establishment, is to be associated with a rejection request.

In another exemplary embodiment 211, a selection and rejection priority may be established for customers. For example, a customer may pay one fee for obtaining a standard status level while another customer may pay a higher fee for a premium status level. The different status levels may be used to provide graduated privilege levels. For example, a premium status level customer may request cancellation of any standard or premium level customer but not visa versa. That is, a standard level customer can only request cancellation for another standard level customer. In this exemplary embodiment, an attempt by a standard status level customer to reject a selection made by a premium status customer would result in a response from the media server similar to "this selection was made by a premium member and cannot be cancelled," or alternately 213 a message to the effect "your request to cancel media file XX was denied. You lack sufficient privileges to cancel this media file."

In another exemplary embodiment 217, a minimum number of rejection requests are required in order for a currently media file to be cancelled prior to its full completion. In this exemplary embodiment, the media server 200 may require that a certain minimum plurality of rejection requests to cancel a media file be received by the media server 200 within a predefined time frame, for example, within thirty seconds of the start of play. If a rejection request is received aster the allowed time frame, the media server 200 may send a return message to the portable computing device 205A,B,C in which the late rejection request originated to the effect of "your request to reject media file XX was received too late. Please send requests within thirty seconds from the start of the media file." In this way, a media files will not be terminated by the routines of the media server unless the required one or more rejection messages are received by the media server during the predefined time period following the start of play of the media file.

In an exemplary embodiment 219, the media server 200 may be configured to require three standard status level customer requests to cancel the pending or current play of a media file while only requiring one request to cancel the pending or current play of media file from a premium status level customer. The media server 200 may send a message to the portable computing device 205A,B,C in which the rejection request originated to the effect of "your request to reject media file XX has been received. Your request is X of Y required to cancel this media file," wherein X is the number of rejection requests thus far received by the media server requesting termination the media file and Y is the required number of rejection requests that must be received in order to terminate the media file. Likewise, a premium status level may be granted privileges such that their selections cannot be cancelled by another irrespective of their status level. The same arrangement may be applied to premium status level customers who require three requests to cancel the pending or current play of media file made by other premium status level customers.

In an exemplary embodiment, a request for a customer's rejection rate may be sent from a portable computing device 205A,B,C to the media server 200. In this exemplary embodiment, a customer enters an SMS text message with a rejection rate RR code. Where necessary, the unique establishment identifier EID 105C 207 and/or unique customer identifier A CID 235A is incorporated into the text message for use by the media server 200 to determine the originator and relevant establishment. The media server 200 may send a message 221 to the portable computing device 205A,B,C in which the rejection request originated to the effect of "your rejection rate is X %," wherein X is the percentage of media selections made by the customer over a period of time that were ultimately terminated by other customers as a result of received rejection requests. In some exemplary embodiments, a message including a customer's current rejection rate is automatically sent to that customer each time a selection made by that customer is terminated as a result of rejection messages from other customers. In this way, if a customer selects a song for play within an establishment and it is terminated as a result of rejection messages from other customers, the selecting customer may be returned a message from the media server 200 indicating that his or her request was terminated by other customers and indicating the resulting updated rejection rate that has been computed for the requesting customer.

Figure 3:
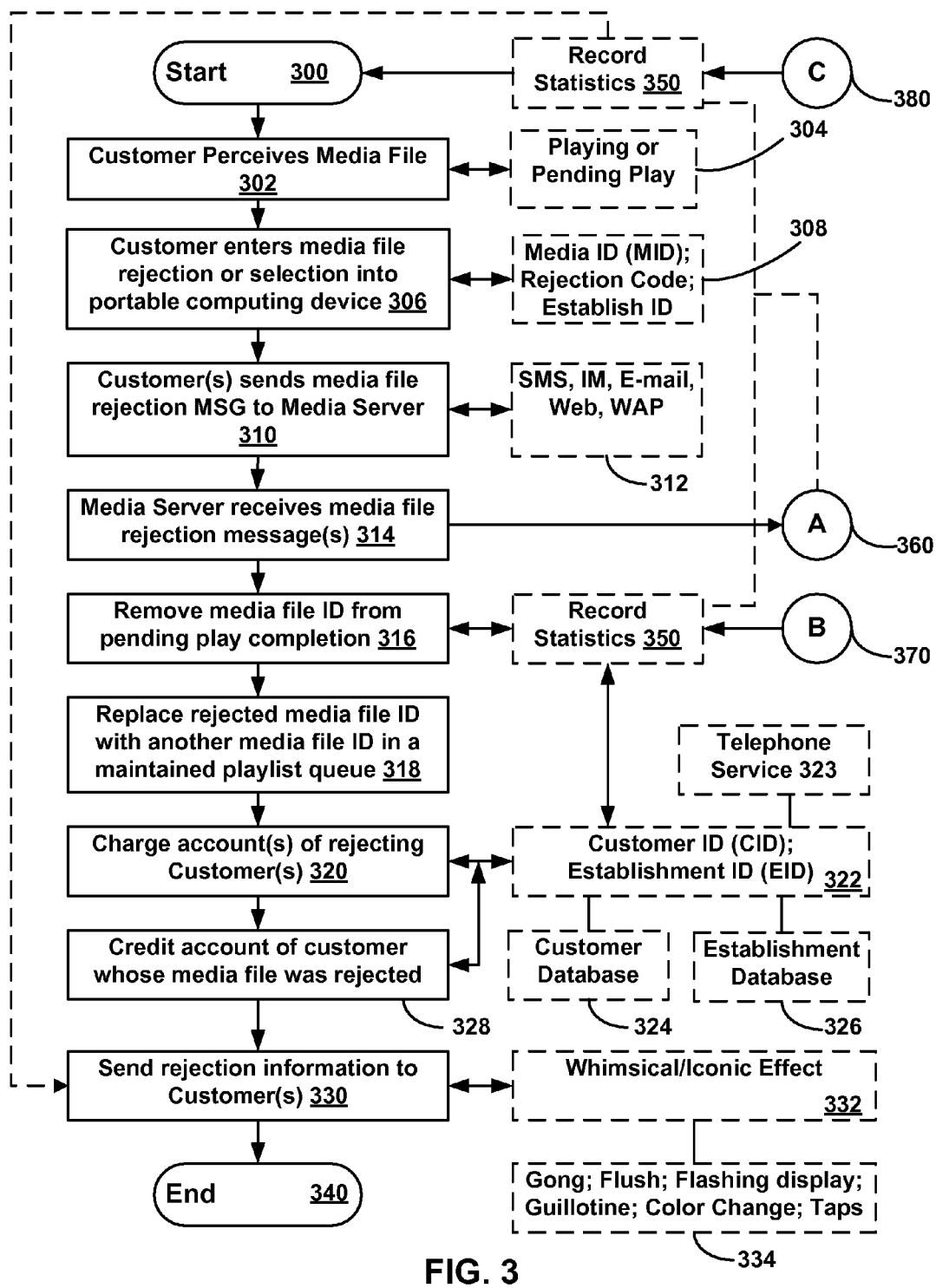
FIG. 3—depicts a process flowchart for the various exemplary embodiments disclosed herein.

Referring to FIG. 3, a process flowchart is depicted for the various exemplary embodiments disclosed herein. In an exemplary embodiment, the process is initiated 300 by one or more customers audibly perceiving a playing media file 302 or visually observing a media file pending for play on a playlist 304. A customer finding the perceived media file to be disagreeable enters 306 a rejection code or selection and where necessary an establishment ID code and/or media identifying code into his or her portable computing device 308.

The customer then sends the media file rejection message to a media server 310. The media file rejection message may be provided in a number of different formats including SMS, IM, E-mail, WAP, or direct website entry 312.

In an exemplary embodiment, the media server receives the request 314, parses the included codes, and causes the removal of the media file identifier from the playlist queue 316. The playlist queue includes both the currently playing media file and those scheduled for play. In another exemplary embodiment, a number of logical tests may be performed at A 360 as is discussed below. In this exemplary embodiment, statistics are recorded for each rejection 350, typically in a customer database 324.

The media server then causes the replacement of the removed media file identifier with another media file identifier in the play queue 318. Typically, the replacement media file identifier is the next listed entry in the playlist queue. The media server then causes an account of the customer who rejected the media file to be charged a fee (in dollars or credits) for the rejection service 320 and causes a credit to be placed in the account of the customer whose selected media file was rejected 328. The charging and crediting process is accomplished using the unique customer identifiers and/or unique establishment identifiers 322 for indexing a customer 324 and establishment database 326. In some exemplary embodiments, the credit step may not be required. For example, if the system is configured not to charge a selecting customer for a media request until the requested media file has completed play, the selecting customer would not have yet been charged when his or her song was terminated early as a result of rejection messages. In such an exemplary embodiment, there is no need to provide a credit back to the requesting customer. In another exemplary embodiment, service charges and credits are provided using a customers' existing service account for their portable computing device 323.

Rejection information is then sent to one or more customers present within the establishment from the media server 330 via their associated portable computing devices. The rejection information may be sent, for example, to the requesting customer, and/or to any customers who send rejection messages that contributed to the termination of the media file. In an exemplary embodiment, a whimsical or iconic effect 332 may accompany the rejection information. For example, whimsical sounds may be output from either the main speakers within the establishment and/or output locally from the portable computing devices. Likewise, whimsical images may be displayed on a large display of the establishment and/or output locally from the portable computing devices. The whimsical effects 334 include a gong sound, a flushing toilet sound, a flashing display, an image of a guillotine, a color change in the playlist for the rejected media file(s) and a brief play of "Taps." If no further rejections are received the process ends 340 until another selection and rejection cycle is initiated.

Figure 4:
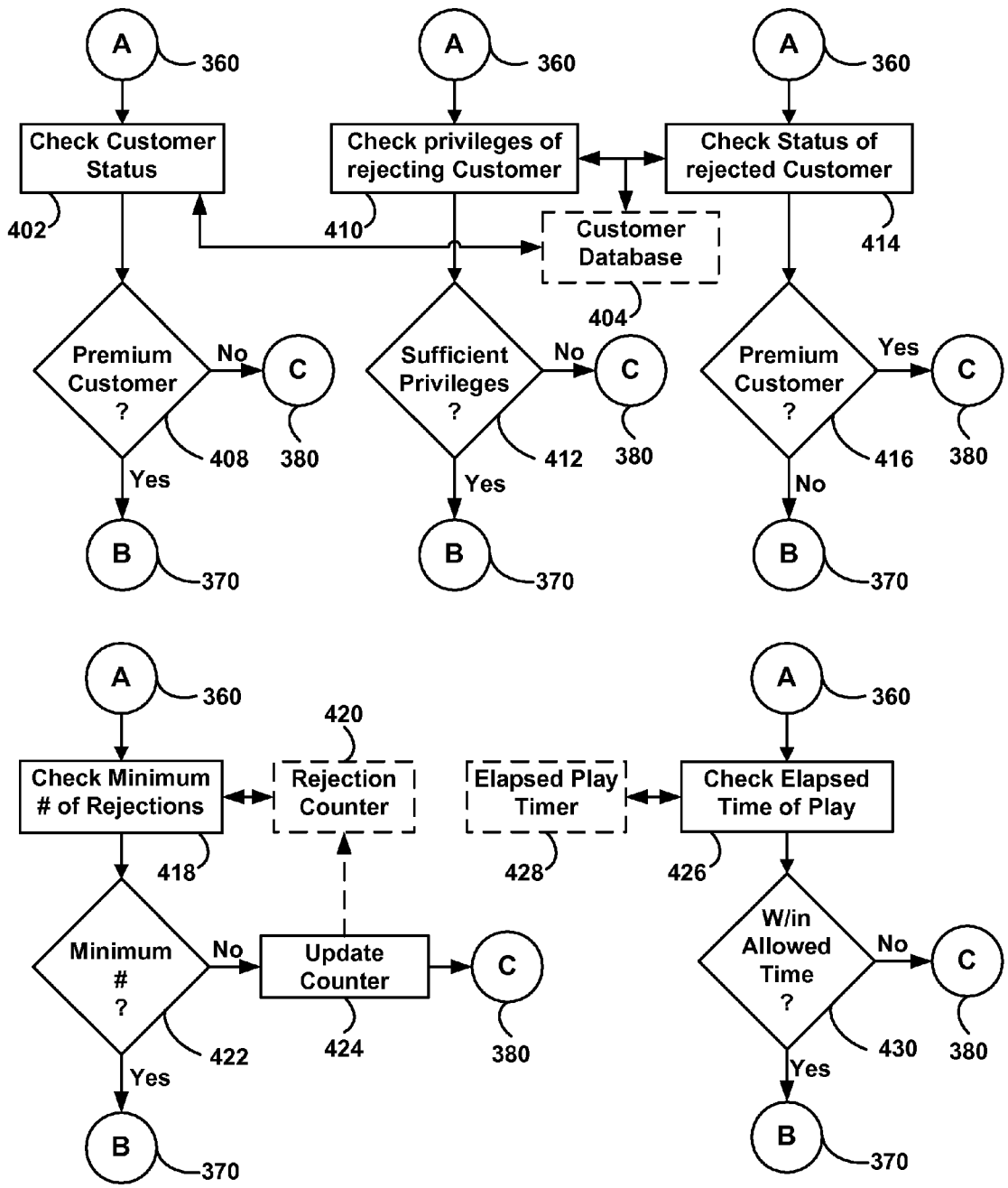
FIG. 4—depicts a series of logical tests performed in the various exemplary embodiments disclosed herein.

Referring to FIG. 4, various tests are conducted depending on the exemplary embodiment. The various logical tests described below may be performed separately or may be combined as is desired to obtain a specific outcome. In one exemplary embodiment, the process continues at A 360 by checking the status of a customer attempting to cancel the pending play of media file 402. The status level of the customer is retrieved from the customer database 404 and in this exemplary embodiment, if the customer is a determined to be a premium customer 408, the rejection is allowed and the process continues at B 370 of FIG. 3 by recording statistics 350 on the successful rejection in the customer database 324 and rejecting the media file 316. If the customer attempting to reject the media file is a standard status level customer 408, the rejection is ignored and the process begins anew at C 380 of FIG. 3. Statistics on the attempted rejection 350 may be recorded in the customer's database record 324 and a message sent to the standard status customer informing him or her of the failed rejection 330.

In an exemplary embodiment, the process continues at A 360 by checking the privileges 410 of the customer attempting to cancel the pending play completion the of media file. The privileges of the customer are retrieved from the customer database 404 and in this exemplary embodiment, if the privileges of the customer are determined to be sufficient to allow media file rejection 412, the rejection is allowed and statistics 350 on the successful rejection may be recorded in the customer database 324. The process continues at B 370 of FIG. 3. If the customer attempting to reject the media file lacks sufficient privileges 412, the rejection is ignored and the process begins anew at C 380 of FIG. 3. Statistics on the attempted rejection 350 may be recorded in the customer's database record 324 and a message sent to the standard status customer informing him or her of the failed rejection 330.

In another exemplary embodiment, the process continues at A 360 by checking the status 414 of the customer who originally selected the media file for pending play completion. As before, the status level of the customer who initially selected the media file is retrieved from the customer database 404. If the initially selecting customer is determined to be a premium customer 416, the rejection is ignored and the process again begins anew at C 380 of FIG. 3. Statistics on the attempted rejection 350 may be recorded in the customer's database record 324 and a message sent to the standard status customer informing him or her of the failed rejection 330. If the initially selecting customer is determined to be a standard customer 416, the media file rejection is allowed and statistics 350 on the successful rejection may be recorded in the customer database 324. The process continues at B 370 of FIG. 3.

In another exemplary embodiment, the process continues at A 360 by checking 418 a rejection counter 420 for a minimum number of received rejection messages. If the minimum number of rejection messages is determined to have been received for the particular media file in the particular establishment 422, the rejection is allowed and statistics 350 on the successful rejection may be recorded in the customer database 324. The statistics include a number, a rate, a frequency, or a percentage of times a media file and/or a customer's selection have been terminated by others 350. The process continues at B 370 of FIG. 3. If the minimum number of rejection messages has not been received 422, the rejection counter 420 is incremented 424 and the rejection is ignored. As before, the process begins anew at C 380 of FIG. 3. Statistics on the attempted rejection 350 may be recorded in the customer's database record 324 and a message sent to the standard status customer informing him or her of the failed rejection 330.

In yet another exemplary embodiment, the process continues at A 360 by checking 426 an elapsed time of play 428 for the media file pending rejection. If the elapsed time of play 428 does not exceed a predetermined length of time 430, for example 30 seconds, the rejection is allowed and statistics 350 on the successful rejection may be recorded in the customer database 324. The process continues at B 370 of FIG. 3. If the elapsed time of play does 428 exceed the predetermined length of time 430, the rejection is ignored. As before, the process begins anew at C 380 of FIG. 3. Statistics on the attempted rejection 350 may be recorded in the customer's database record 324 and a message sent to the standard status customer informing him or her of the failed rejection 330.

In various exemplary embodiments a combination of logical tests are used to ensure that multiple conditions be met before a media file be terminated as a result of received rejection messages relating to that media file as it is currently playing and/or currently pending for play within a particular identified establishment. For example, a plurality of logical tests may be required to terminate a currently playing media file within a particular establishment, as follows; a minimum number of rejection requests must be received relating to the currently playing file within a particular establishment within a minimum time period from the start of play of the media file within the establishment. More specifically, the media server 200 may be configured to require a minimum of five rejection requests to be received relating to a currently playing file within a particular establishment within thirty seconds of the start of play of the media file, in order for the media file to be terminated early. If these conditions are not met, the rejection requests are not successful and the media file continues to play to completion. In some such exemplary embodiments, each establishment may independently set the minimum number of rejection requests and/or the termination time period as configuration parameters for their establishment. This enables different establishments to configure the media server to moderate their site with different logical test parameters. Such parameters are generally configured through an establishment representative interacting with a web interface of the media server 200.

The various exemplary inventive embodiments described herein are intended to be merely illustrative of the principles underlying the inventive concept. It is therefore contemplated that various modifications of the disclosed embodiments will, without departing from the inventive spirit and scope, be apparent to persons of ordinary skill in the art. They are not intended to limit the inventive embodiments to any precise form described. In particular, it is contemplated that functional implementation of the various inventive embodiments described herein may be implemented equivalently in hardware, software, firmware, and/or other available functional components or building blocks. No specific limitation is intended to a particular arrangement or programmatic sequence. Other variations and inventive embodiments are possible in light of above teachings, and it is not intended that this Detailed Description limit the inventive scope, but rather by the Claims following herein.

The invention claimed is:

1. A computer implemented method for collaborative media selection for physical establishments comprising:
   maintaining a playlist queue comprising an index of retrievable media files pending for play within an establishment, the index including a unique media identifier for each media file pending for play within the establishment;
   receiving a plurality of customer generated rejection messages over a network, each of the rejection messages including a unique media identifier of a media file pending for play within the establishment and a unique customer identifier of a rejecting customer;
   determining, for each of a plurality of unique media identifiers in the playlist queue, if a threshold number of rejections have been received to reject the media file associated with the media file identifier from the playlist queue;
   removing each unique media file identifier from the playlist queue for which at least the threshold number of rejections has been determined to have been received; and, deferring removal of each unique media file identifier from the playlist queue for which the threshold number of rejections has not been determined to have been received;
   providing a database including a plurality of customer account records, each of the customer account records having a unique customer identifier indexed thereto; and
   charging a rejection fee to each customer account record of each rejecting customer of associated with the removed media file identifier.

2. The computer implemented method according to claim 1 wherein a plurality of the unique media identifiers within the playlist queue each has at least one unique customer identifier of a selecting customer associated therewith.

3. The computer implemented method according to claim 2 further comprising: crediting back a selection fee to the customer account record of each selecting customer of a removed media file identifier.

4. The computer implemented method according to claim 2 further comprising:
   charging a selection fee to each account record for each selecting customer of a media file which has completed play within the establishment.

5. The computer implemented method according to claim 1 wherein each of the rejection messages comprise an SMS formatted text message.

6. The computer implemented method according to claim 1 wherein the rejection fee is charged through a reverse billing process that bills an account associated with a portable computing device from which the rejection message was sent.

7. The computer implemented method according claim 1 further comprising:
   maintaining rejection history statistics for each of a plurality of unique media file identifiers; the rejection history statistics including at least one of a number, a rate, a frequency, or percentage of
   times that the media file associated with the unique media file identifier has been removed from a playlist queue prior to its completed play within the establishment as a result of received customer generated rejection messages.

8. The computer implemented method according to claim 1 further comprising:
maintaining rejection history statistics of each of a plurality of customers, the statistics for each customer including at least one of a number, a rate, a frequency, or a percentage of media file selections made by each customer that did not play to completion within an establishment as a result of received customer generated rejection messages.

9. The computer implemented method according to claim 1 further comprising:
maintaining at least one unique media playlist queue for each of a plurality of physical establishments, each of the physical establishments having a unique establishment identifier associated therewith.

10. A computer implemented method for collaborative media selection for physical establishments comprising:
maintaining a playlist queue comprising an index of retrievable media files pending for play within an establishment, the index including a unique media identifier for each media file pending for play within the establishment;
receiving a plurality of customer generated rejection messages over a network, each of the rejection messages including a unique media identifier of a media file pending for play within the establishment and a unique customer identifier of a rejecting customer;
determining, for each of a plurality of unique media identifiers in the playlist queue, if a threshold number of rejections have been received to reject the media file associated with the media file identifier from the playlist queue;
removing each unique media file identifier from the playlist queue for which at least the threshold number of rejections has been determined to have been received; and, deferring removal of each unique media file identifier from the playlist queue for which the threshold number of rejections has not been determined to have been received;
providing a database including a plurality of customer account records, each of the customer account records having a unique customer identifier indexed thereto; and
assigning a customer status level to each customer account included in the database, the customer status levels including a premium status and a standard status.

11. The computer implemented method according to claim 10 further comprising:
granting a customer having the premium status superior media file rejection privileges to those of a customer having the standard status.

12. The computer implemented method according to claim 10 further comprising:
granting a customer having premium status greater rights the ability to reject a media file requested by a customer having standard status but not visa versa.

13. A computer implemented method for collaborative media selection for physical establishments comprising:
maintaining a playlist queue comprising an index of retrievable media files pending for play within an establishment, the index including a unique media identifier for each media file pending for play within the establishment;
receiving a plurality of customer generated rejection messages over a network, each of the rejection messages including a unique media identifier of a media file pending for play within the establishment and a unique customer identifier of a rejecting customer;
determining, for each of a plurality of unique media identifiers in the playlist queue, if a threshold number of rejections have been received to reject the media file associated with the media file identifier from the playlist queue;
removing each unique media file identifier from the playlist queue for which at least the threshold number of rejections has been determined to have been received; and, deferring removal of each unique media file identifier from the playlist queue for which the threshold number of rejections has not been determined to have been received; and
sending a termination message to a portable computing device of each selecting customer whose media file selection was removed from the playlist queue; the termination message including indicia that the customer's selection was rejected for play.

14. The computer implemented method according to claim 13 wherein the termination message further includes indicia of the number of rejections received for the customer's selection.

15. A computer implemented method for collaborative media selection for physical establishments comprising:
maintaining a playlist queue comprising an index of retrievable media files pending for play within an establishment, the index including a unique media identifier for each media file pending for play within the establishment;
receiving a plurality of customer generated rejection messages over a network, each of the rejection messages including a unique media identifier of a media file pending for play within the establishment and a unique customer identifier of a rejecting customer;
determining, for each of a plurality of unique media identifiers in the playlist queue, if a threshold number of rejections have been received to reject the media file associated with the media file identifier from the playlist queue;
removing each unique media file identifier from the playlist queue for which at least the threshold number of rejections has been determined to have been received; and, deferring removal of each unique media file identifier from the playlist queue for which the threshold number of rejections has not been determined to have been received; and
maintaining at least one unique media playlist queue for each of a plurality of physical establishments, each of the physical establishments having a unique establishment identifier associated therewith, wherein each customer generated rejection message further includes a unique establishment identifier of a physical establishment to which the rejection message relates.

16. A non-transitory computer readable storage medium comprising instructions which when executed by a processor, cause the processor to:
maintain a playlist queue comprising an index of retrievable media files pending for play within an establishment, the index including a plurality of unique media identifiers, each associated with a media file pending for play within the establishment;
receive a plurality of customer generated rejection messages over a network, each of the rejection messages including a unique media identifier of a media file pending for play within the establishment and a unique customer identifier of a rejecting customer;
determine, for each of a plurality of unique media identifiers in the playlist queue, if a threshold number of rejections have been received to reject the media file associated with the media file identifier from the playlist queue;
remove at least one media file identifier from the playlist queue for which at least the threshold number of rejections has been received; and,
defer removal of at least one media file identifier from the playlist queue for which the threshold number of rejections has not been received;
provide a database including a plurality of customer account records, each of the customer account records having a unique customer identifier indexed thereto; and
charge a rejection fee to each customer account record of each rejecting customer of associated with the removed media file identifier.

\* \* \* \* \*